(12) United States Patent
Brinkman, Jr. et al.

(10) Patent No.: US 11,170,819 B2
(45) Date of Patent: Nov. 9, 2021

(54) DYNAMIC VIDEO HIGHLIGHT

(71) Applicant: Microsoft Technology Licensing, LLC, Redmond, WA (US)

(72) Inventors: Donald Frank Brinkman, Jr., Seattle, WA (US); Suvamsh Shivaprasad, Bellevue, WA (US); Max Artemov, Seattle, WA (US); Lenin Ravindranath Sivalingam, Redmond, WA (US); Matthai Philipose, Seattle, WA (US); Peter Bodik, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/411,611

(22) Filed: May 14, 2019

(65) Prior Publication Data
US 2020/0365188 A1 Nov. 19, 2020

(51) Int. Cl.
*G11B 27/10* (2006.01)
*H04N 21/472* (2011.01)
(Continued)

(52) U.S. Cl.
CPC ......... *G11B 27/102* (2013.01); *H04N 21/472* (2013.01); *H04N 21/8456* (2013.01); *H04N 21/8549* (2013.01)

(58) Field of Classification Search
CPC .............. G11B 27/102; H04N 21/472; H04N 21/8456; H04N 21/8549
See application file for complete search history.

(56) References Cited

U.S. PATENT DOCUMENTS

2003/0093790 A1 5/2003 Logan et al.
2007/0239787 A1 10/2007 Cunningham et al.
(Continued)

FOREIGN PATENT DOCUMENTS

WO 2016057416 A1 4/2016

OTHER PUBLICATIONS

Text Summarization Techniques: A Brief Survey. Mehdi Allahyari, et. al., Jul. 28, 2017, 9 pages.
(Continued)

*Primary Examiner* — Sunghyoun Park
(74) *Attorney, Agent, or Firm* — Medley, Behrens & Lewis, LLC

(57) ABSTRACT

Described herein is a mechanism for creating a dynamic video highlight from a plurality of video segments. A metadata collection agent collects metadata comprising attributes about a video, segments within the video where one or more events occur, attributes about the creator of the video and so forth. The metadata is collected and used to create highlight video definitions comprising a set of metadata attribute-value pairs. The highlight video definitions can be created in an interactive fashion by presenting a user interface allowing selection of a combination of attribute-value pairs to include/exclude segments from the definition and/or manual selection of custom segments. The highlight video definitions can be stored and/or shared among users. The video highlight definitions are utilized to instantiate one or more video players to play the video segments in an identified order without assembling the video segments into a separate video.

20 Claims, 11 Drawing Sheets

(51) Int. Cl.
*H04N 21/845* (2011.01)
*H04N 21/8549* (2011.01)

(56) References Cited

U.S. PATENT DOCUMENTS

| | | | |
|---|---|---|---|
| 2007/0300258 A1* | 12/2007 | O'Connor | A23L 2/52 725/44 |
| 2010/0082585 A1 | 4/2010 | Barsook et al. | |
| 2011/0202844 A1* | 8/2011 | Davidson | G06F 16/54 715/723 |
| 2012/0110455 A1 | 5/2012 | Sharma et al. | |
| 2012/0311094 A1* | 12/2012 | Biderman | H04N 21/8456 709/219 |
| 2013/0226983 A1* | 8/2013 | Beining | H04L 65/4084 709/201 |
| 2014/0026053 A1 | 1/2014 | Huang et al. | |
| 2015/0063781 A1 | 3/2015 | Silverman et al. | |
| 2016/0196852 A1* | 7/2016 | Sievert | G11B 27/3027 386/241 |
| 2016/0203843 A1 | 7/2016 | Beals et al. | |
| 2021/0004131 A1 | 1/2021 | Varshney et al. | |

OTHER PUBLICATIONS

"Non Final Office Action Issued in U.S. Appl. No. 16/459,101", dated Apr. 17, 2020, 18 Pages.
"International Search Report and Written Opinion Issued in PCT Application No. PCT/US20/033886", dated Aug. 14, 2020, 11 Pages.
"International Search Report and Written Opinion Issued in PCT Application No. PCT/US20/025095", dated Sep. 9, 2020, 17 Pages.
"Final Office Action Issued in U.S. Appl. No. 16/459,101", dated Oct. 8, 2020, 21 Pages.

* cited by examiner

DYNAMIC VIDEO HIGHLIGHT

FIELD

This application relates generally to summarization of videos such as through assembling clips of one or more videos into a single video. More specifically, this application relates to improvements in automatically identifying such clips, arranging such clips, and playback of the resultant video.

BACKGROUND

A video, by its very nature, is a linear content format. For example, movies are designed to be presented in a serial format, with one scene following another until the entire story is told. Similarly, a sports event captured on video, captures the sequence of events, one after the other, that make up the sports event. However, often a user wants to only see parts of a video. A particular scene, scenes that contain specific characters or dialogue, all the goals in a sports event, only the "exciting" parts of a big game, and so forth Videos are notoriously difficult to analyze and often it require time-consuming human labor to pick out parts a user might be interested in. Even after such manual effort the result is a single, static set of highlighted moments that does not embody the multitude of combinations that might interest a user.

It is within this context that the present embodiments arise.

DETAILED DESCRIPTION

Figure 1:
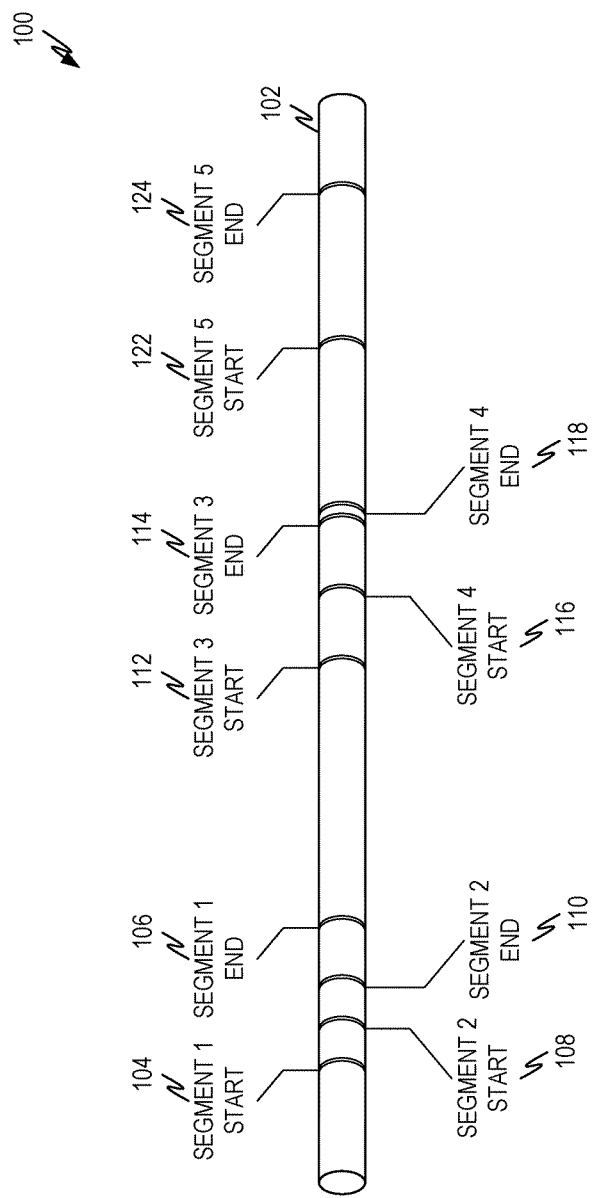
FIG. 1 illustrates an example video timeline with representative event start and end times.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

With the advent of streaming video services, there is more content available online to users than ever before. Some video services are geared toward professionally produced videos such as movies, television programs, and so forth. Other video services are geared toward user generated content such as user produced videos and other such content. Some video services are geared toward particular types of content. For example, as of this writing, twitch.tv has numerous gaming channels where users can stream videos of their gameplay of video games and other activities. Often times, video services allow users or other content creators to post links to other user platforms such as user blogs, websites, and other video content. Thus, video services often drive traffic to other websites along with presenting video content itself.

Many video services provide the ability to embed a video in a $3^{rd}$-party website and for wide video control by users either on the $1^{st}$ party or $3^{rd}$ party website such as allowing users to seek to a particular location in a video, fast forward, pause, rewind, play video at certain resolutions, select between different audio tracks, turn closed captions on and off, and so forth. The video service provides video content through a local player that sends signals to the video streaming service to adjust the location in the video that should be streamed (e.g., seeking to a particular location in a video, fast forward, rewind, and so forth) and/or adjust other aspects of the delivery. The video service often works with the local player to ensure that sufficient video is buffered on the local side to ensure smooth playback of the video.

However, even with the control allowed to users, video streaming is a linear experience. There is no ability to identify within a video the location where a desired event occurs. For example, in a video of a sports event, it is impossible to identify all the locations within that video where goals are scored. As another example, if a user wants to see how others handle a particular location in a video game, the user cannot easily pull from multiple videos all those segments where other users have played that portion of the video game.

Another problem with user generated video content is that there is usually nothing analogous to movie trailers that can be played to give potential viewers a sense for what the user video contains. Thus, for streaming video, putting together a highlight or preview video is difficult.

In short, if a user desires to create a highlight video, either a movie trailer type or where multiple segments of interest are assembled into a single video, the user must manually identify videos of interest, select segments of interest within those videos, and them copy the segments into a new video that is made available for playing.

Embodiments of the present disclosure can create dynamic highlight videos without assembling video segments of interest into a separate video. Embodiments utilize metadata collection agents to collect metadata about a video and about segments within the video. This metadata set forms a rich description not only of the video but also of events and/or other content within the video and points at which the events occur. For example, metadata about a video can comprise attributes that describe the subject matter of the video such as a general type (sporting event), a particular item or title (Manchester United v. Arsenal), dates of production, producers, actors, location and/or service where the video can be accessed, and/or so forth. Metadata that describes a video segment can comprise attributes that describe one or more aspects associated with the segment such as an event or location illustrated in the segment (video game location, base captured, event that occurs, and/or so forth), where within the video the segment is located (start time), duration of the video segment (stop time, duration of the segment), and so forth.

The metadata collected for a video is assembled and stored for later use and evaluation.

A highlight video definition is created from the metadata of one or more videos. This can be accomplished either programmatically or interactively or a combination thereof. For example metadata describing user streaming of video games can be collected. A user interface can be presented to a user that allows the user to include and/or exclude combinations of metadata aspects. For example, using selection mechanisms, the user can put together a highlight video definition that will extract all times where the user Random-Boy fought the White Wizard on the Plains of Despair or a highlight video definition that will extract all home runs hit in Game 2 of the 2017 world series.

The highlight video definition will then be used to identify all video segments that correspond to the combination of metadata attributes. Once the video segments have been identified, the video segments will be ordered according to a segment play order that defines the play order for the video segments.

One or more local video players will be instantiated to play the video segments in the desired order. The players will interact with the appropriate video services to play the proper video segment at the proper time. In order to reduce time needed to buffer video segments, multiple players can be instantiated so that one or more upcoming segments can be buffering while another segment is playing. By switching between the players, the segments can be played without interruption.

The result is a highlight video that does not rely on making copies of video segments and assembling them into a separate video. This can provide both technical and other advantages. Because the highlight videos are created dynamically, copyright holders have little to fear from copyright violations. Highlight videos can also support linking to other sites, blogs, services, and so forth to drive traffic to the original video owner's websites, and so forth. Because a separate video is not created, no additional memory or storage is needed to create and save a separate video. Because the video is dynamic and because a highlight video definition is much smaller than a video, the number of highlight videos that can be created and supported is increased significantly. This allows a wider audience to be served. Furthermore, because the highlight videos are dynamic in nature and can be automatically created, the highlight videos make user generated content much more accessible and available to interested users in much the same way that search services make internet content much more accessible and available to interested users.

DESCRIPTION

Embodiments of the present disclosure can apply to a wide variety of systems whenever video streaming services allow control by local video players of the streaming video. For example, local video players (e.g., video players that do not reside on the streaming service) can often begin playing a streaming video at a particular location, fast forward, rewind, and so forth. Streaming services that allow a local video player to begin playing a video at a particular location and stop playing the video a particular location can be used to create dynamic highlight videos as described herein.

Video Segment Overlap

FIG. 1 illustrates an example video timeline 100 with representative segment start and end times. In the figure, segment 1 starts at time 104 and continues until time 106. Segment 2 starts at time 108 and continues until time 110. Segment 3 begins at time 112 and finishes at time 114. Segment 4 starts at time 116 and ends at time 118. Segment 5 begins at time 122 and finishes at time 124. Thus, video segments (also referred to as segments) represent a subset of the video content. FIG. 1 also illustrates that when a video 102 has multiple video segments, the video segments can overlap in different fashions.

In some instances, there is no overlap between segments. For example, segment 1, segment 3, and segment 5 do not overlap. In other instances, one segment can be completely contained within another segment. For example, segment 2 is contained within segment 1 as shown by their respective start and stop times. In still other instances, one segment can begin, and another segment can start after the first segment but end after the first segment is complete. For example, segment 3 starts at time 112, segment 4 starts at time 116, which is after time 112. However, segment 3 ends at time 114, which is before the end of segment 4 at time 118.

The various ways that segments can overlap can influence how the segments are assembled into a play order as described herein. Furthermore, when multiple videos are considered, the overlap or non-overlap of segments can influence play order. Determining segment play order is discussed in greater detail below.

Collecting Metadata

Figure 2:
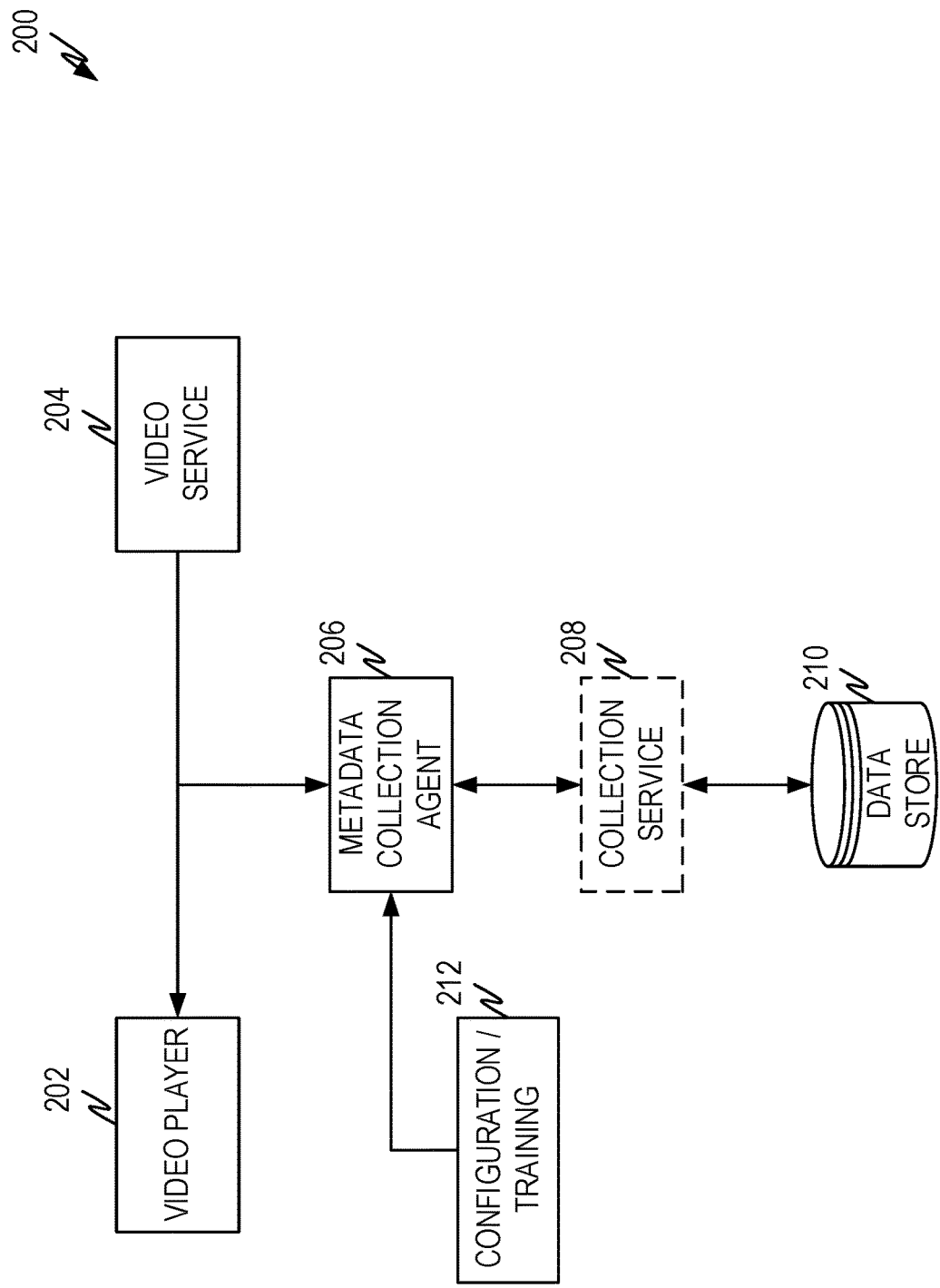
FIG. 2 illustrates an example diagram depicting a metadata collection agent according to some aspects of the present disclosure.

FIG. 2 illustrates an example diagram 200 depicting a metadata collection agent according to some aspects of the present disclosure. In this example, a video service 204 streams a video to a video player 202. The metadata collection agent 206 can be part of or reside on the video services 204 systems, be part of or reside on the systems of the video player 202, reside on a separate system, and/or some combination thereof. The metadata collection agent 206 can function as long as it can receive the video stream and/or access metadata about the video.

The metadata agent 206 can be configured and/or trained as illustrated in 212 in order to identify particular metadata as described herein. As described below, the metadata collection agent 206 can analyze the video stream and use machine learning, image recognition techniques, and/or other approaches to identify information about the video and/or segments within the video. Thus, the metadata collection agent 206 can comprise one or more trained machine learning models to extract metadata and/or one or more analytical models that are created to extract metadata as described in greater detail below.

Additionally, or alternatively, the metadata collection agent 212 can obtain metadata about the video from the video service 204 or from one or more other systems. For example, websites such as IMDB.com maintain a large database comprising metadata about movies, television shows, and/or other videos. As another example, video services allow video owners and/or others to associate metadata with a video. For example, video services 204 can have such information as a title, a content owner (video creator, channel owner, channel name, and so forth), links to other websites associated with the content owner, a description of the content of the video, comments that others have made about the video, chat windows, and so forth. The metadata collection agent 206 and/or a different metadata collection agent can crawl the video service, other websites, and so forth to identify and extract metadata about the video.

Additional information about metadata is described below.

Metadata about the video is collected by one or more metadata collection agents 206 and stored in at least one data store 210. The metadata can be stored by the metadata collection agent 206 directly, can send collected metadata to one or more collection services 208 which the store the metadata in one or more data stores 210, or any combination thereof.

Metadata collection agents can be set to run periodically or aperiodically to collect metadata information. For example, if a particular channel of a video service has new content added on a very frequent basis, a metadata collection agent 206 that is tailored to collect information from that service and channel can be sent to run once every 24 hours to collect metadata about new videos appearing thereon.

Additionally, or alternatively, metadata collection agents 206 can be triggered by an event, combination of events, condition, combination of conditions, and so forth. For example, when a live streaming event occurs, a metadata agent can be triggered to run during the live stream to collect information.

If multiple videos and/or other content are associated with a single streaming service, channel, and/or so forth, the content can be ordered by one or more metadata properties before collection and analysis. For example, videos can be arranged by time.

For analysis of video content as described herein, the videos can be downloaded from the streaming service, analyzed while the video is streamed from the service, or a combination thereof.

In this way, a rich collection of metadata both about the video itself and about segments within the video is collected.

Figure 3:
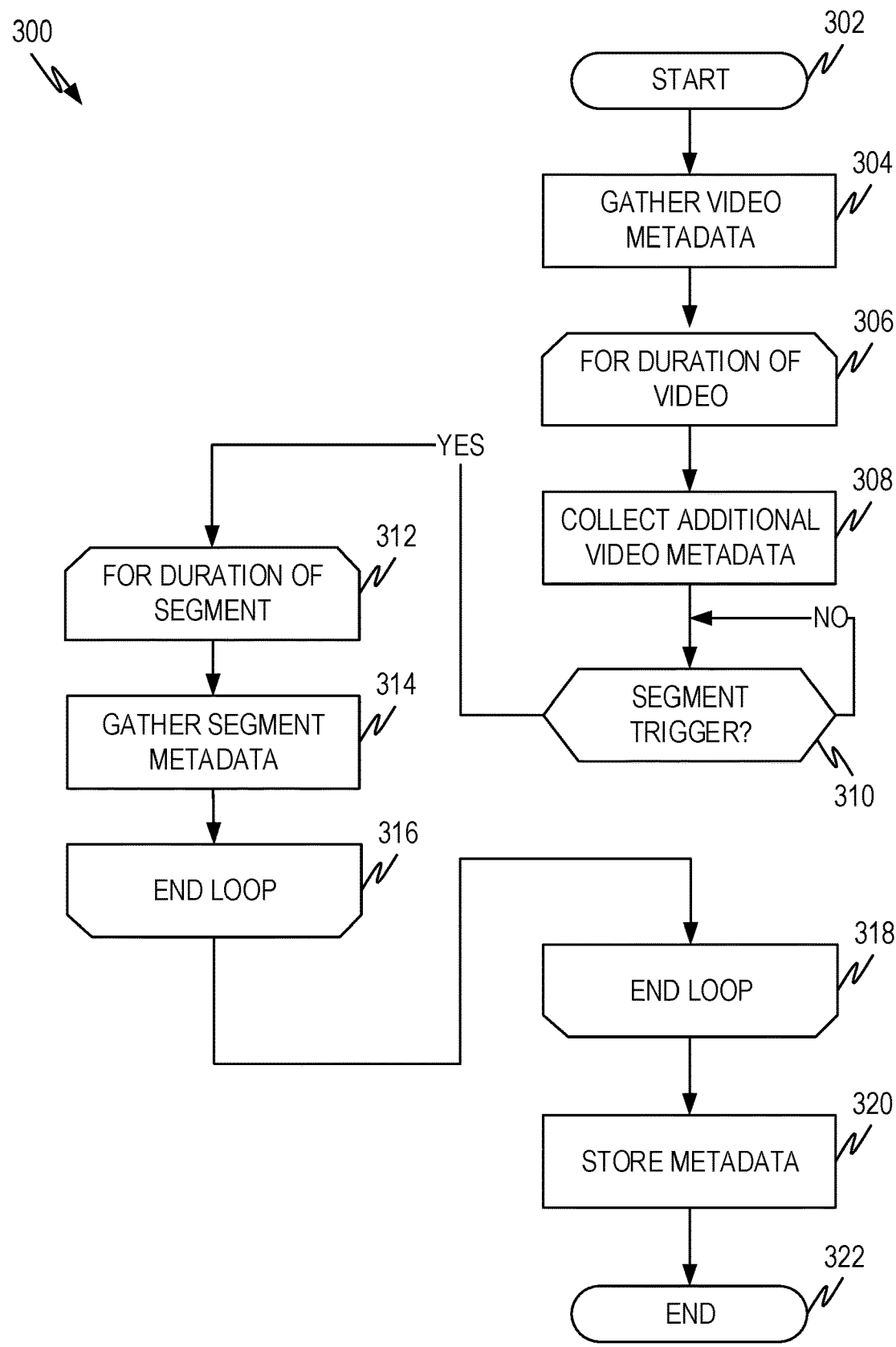
FIG. 3 illustrates an example flow diagram for gathering metadata according to some aspects of the present disclosure.

FIG. 3 illustrates an example flow diagram 300 for gathering metadata according to some aspects of the present disclosure. The operations of the flow diagram can be executed by one or more metadata collection agents working together and/or using different techniques to collect metadata about a video and about segments within the video.

The example method begins at operation 302 and proceeds to operation 304. Operation 304 collects metadata about the video in one or more ways. The particular methods used to collect metadata about a video may depend on the video service where the video is located. For example, as of this writing, a video hosted on youtube.com has an associated web page which may one or more of the following:

The video itself
The video source (e.g., URI of the video)
A video title
The number of views that the title has had
Number of likes/dislikes of the video
A description and/or link to a content owner's youtube channel
A description of the video
Links to other websites, blogs, social media accounts, and so forth
A category for the video
An indication of license terms for the video
A list of related videos
A set of comments made by users
Other information As another example, a stream on twitch.tv has an associated web page which may have one or more of the following:

The video and/or livestream itself
The video source (e.g., URI of the video)
A title
The content owner
Links to other videos from the content owner
Clips of the video
Category for the video
Tags associated with the video describing what the video is such as speed run of a video game, the language of the video, the type of video game being played, and so forth
The number of views and/or viewers
A chat stream for the video containing viewer's comments on the video and what is happening.
Other information As can be seen from these examples, a great deal of metadata can be derived from the video service where the video is hosted. Thus, the webpage associated with the video, and or other webpages, social media sites, and so forth linked to the webpage associated with the video can be a rich source of metadata that can be extracted by examining the webpage, video service, linked sites, and so forth. Additionally, or alternatively, for certain types of video content some websites host metadata repositories about videos, such as the previously mentioned IMDB.com. Web crawling to extract information is well known and need not be described further. Web crawlers used in association with embodiments of the present disclosure are configured to look for specific key words and other clues that describe the desired metadata attributes that the system collects.

Additionally, or alternatively, machine learning can be used to extract some metadata. When analyzing text and other information extracted from a website, social media, comments, a chat stream, and so forth, machine learning can be used to summarize the information. The specific problem is text summarization and the problem solved is to create a short, accurate, and fluent summary of a longer text document. Numerous machine learning models exist in the technical literature and any such models can be applied to this problem. For example, the paper by Mehdi Allahyari, Seyedamin Pouriyeh, Mehdi Assefi, Saeid Safaei, Elizabeth D. Trippe, Juan B. Gutierrez, and Krys Kochut, entitled "Text Summarization Techniques: A Brief Survey," July 2017 (arXiv:1707.02268v3 [cs.CL]), incorporated herein by reference, describes several techniques that can be used.

Additionally, or alternatively, other information can be extracted when analyzing text and other information extracted from a website, social media, comments, a chat stream, and so forth. For example, machine learning or other analysis techniques can be used to extract information such as a user sentiment associated with a particular statement, the overall sentiment of a chat stream, or group of comments, and so forth. The same techniques can be used to identify references to particular entities, such as key characters, key events, and so forth. The presence or absence of offensive language can be detected in order to allow users to understand what is in the video, comments, and so forth. These and other characteristics can be detected and gathered as metadata.

All of these mechanisms can be used by one or more metadata collection agents to collect metadata in conjunction with operation 304.

Operation 306 begins a loop that examines the content of the video itself to identify additional video metadata, video segments, and/or video segment metadata.

Operation 308 utilizes various analysis techniques to identify additional video metadata. For example, advances in machine learning have opened up many techniques that allow analysis of video to extract information about what is happening and/or what is being displayed on the video.

In one example, trained language understanding models can be used to analyze and understand the audio track(s) associated with the video. Consider that a video with commentary contains a lot of information about what is happening in the video. As an example, sports events often have commentators describing what is happening, with announcers talking about who is at bat, who has the ball, what plays are being run, and so forth. Videos of people playing video games, performing activities, and so forth also have a lot of information about what is happening in the video in the associated audio track(s). This can comprise not only the specific meaning of the words spoken but the volume of the speech, its intonation, and other attributes.

Machine learning can be applied to the audio tracks to extract metadata describing the video, identifying video segments, or both. Language understanding models often use speech to text conversion to convert the audio to text and then use trained machine learning models to extract semantic information from the resultant text.

Techniques to extract semantic information from text through machine learning models are known and need not be further discussed as one of skill in the art would know how to select and train a machine learning model that will analyze one or more soundtracks and extract information from the soundtrack that describes what is happening. For example, a machine learning model may be created to recognize certain key words, phrases, dialogs and so forth and to correlate these to events that are happening in the video.

As another example, soundtracks, chat information, and so forth can provide clues as to when something exciting is happening. The roar of the crowd, the frequency of commentary in a chat window, and so forth are all indicators that something worthwhile is happening. Thus, machine learning and other analysis techniques can be used to identify potentially interesting events in the video and either correlate them to events in the video or use the roar of the crowd, frequency of commentary in a chat window, and other such events as a trigger to engage further processing to extract information from the video.

As yet a further example, video processing and machine vision techniques can be used to analyze the video to recognize content in the video. Machine vision techniques are known and can be trained to determine the subject of a video image and/or video frame, auto caption an image and/or video frame, and so forth. For example, models exist that can recognize particular items in an image or video frame. Machine learning approaches for auto-captioning are particularly relevant. These models typically take an input image and have one more feature extraction layers and/or models. The resultant features are input into a trained model that will correlate the features with different words that describe the features and produce a caption that describes what is represented in the image.

Additionally, machine vision techniques and/or optical character recognition (OCR) techniques can be used to recognize text in an image, video, and/or video frame. The recognition of text in an image such as a video frame can give important information, such as player numbers and/or names, names of locations, signage, and so forth. These techniques are equally applicable to the video content of the present disclosure. Thus, embodiments can use OCR techniques on video frames to recognize and extract text displayed in the video. The text can then be analyzed to identify metadata attributes that describes the content of the video.

As a representative example as to how such models can be trained, a set of desired recognition events can be identified. For example, a person at bat in baseball, a particular type of event such as combat in a video game, a particular person appearing in the video, key words and/or key phrases in a sound track, music in a sound track, and/or any other type of event. Training data can then be collected, and machine learning techniques applied to recognize the associated event. A plurality of machine learning models, each trained to recognize a different event and/or different sets of events can be run in parallel. In this context an event means anything of interest in the video such as a goal, a place, a particular thing that happened, a particular person or thing, a particular number of people or things, and/or so forth. Furthermore, machine learning models can be trained using a single type of data (e.g., audio, image, and so forth) or can be trained with multiple different types of data combined (e.g., audio and video together).

Depending on the event, it may indicate metadata for the video (e.g., as part of operation 308), can indicate a segment of the video (e.g., as in operation 310), and as part of other operations as described herein. For example, recognizing a particular location in a video game may provide metadata regarding the video (e.g., the Plains of Despair appear in the video can be collected by operation 308), but may also indicate a segment trigger in operation 310, because a particular location was recognized.

Operation 310 watches for potential triggers to video segments. Using the above example, the appearance of the Plains of Despair can indicate that a battle with the White Wizard will occur soon. Similarly, the roar of the crowd, the frequency of chat comments, and other such events can indicate that something is happening that should be identified as a segment.

Once a segment of interest has been indicated by operation 310, execution proceeds to operation 312 which begins a loop for the duration of the segment. Depending on the trigger, it may be useful to buffer the video so that the video can be analyzed starting at a point before the trigger. For example, the roar of the crowd can indicate something is happening now and to understand what is happening the previous 45 seconds (or some other time threshold) needs to be analyzed to capture the entirety of the segment. Therefore, in some embodiments, operation 312 begins at the time that operation 310 identified a segment of interest. In other embodiments, the segment analysis begins at a point that is a threshold amount of time before operation 310 identified segment of interest. In still further embodiments, analysis can begin at a point that is a threshold amount of time after operation 310 identifies a segment of interest. In still embodiments, whether the segment analysis begins before, at, or after the point a segment of interest is identified depends on the type of signal that triggered operation 310 to recognize a segment of interest. For example, a roar of the crowd may start segment analysis at a point before the roar was identified. While a commentary indicating that a player would be coming to bat may start segment analysis at a point after the commentary was recognized. In still another embodiment, some combination of the above is used.

Once the starting location in the video that the segment of interest will be examined is identified, the segment is analyzed in the loop of operation 312, 314, and 316. The analysis loop can be the same as described above with one or more trained machine learning models and/or one or more other analysis methods examining the video (image), audio, and/or other information, and/or combinations thereof in the segment to identify metadata as described above. The purpose of the analysis loop is to extract metadata that captures event(s) depicted in the video segment. Events of interest are defined during the training and/or configuration process (e.g., 2:212) where the one or more machine learning models are trained. This is because the machine learning models are each trained to recognize particular things and/or produce particular descriptive material (e.g., captioning).

From the above, it should be evident that the metadata collection agent(s) used in operations 304, 308, and/or 314 can be tailored to the particular type of content in the associated video. Thus, machine learning models that recognize events in baseball related videos may be different than machine learning models that recognize events in cricket related videos, which are different than machine learning models that recognize events in a particular type of video game, and so forth. Thus, the models that are employed in the method of FIG. 3 can be selected and trained based on the content type.

Based on the analysis, the beginning location and ending location of the segment within the video can be identified. In other words, the analysis window of the segment analysis loop may be larger than what is ultimately identified as the video segment of interest. For example, a trained machine learning model that identifies a scored goal can be used on the segment analysis window and, based on the location of the scored goal, a leader (time before the recognized event) and trailer (time after the recognized event) can be added before the recognized event to arrive at the beginning location and added after the recognized event to arrive at the ending location in the video, respectively. The length/duration of the leader can be a fixed time value or can be variable based on the type of event (scored goal, character death in a video game, and so forth). Alternatively, recognition techniques such as image recognition, audio recognition, and/or a combination thereof can be used to identify the starting location of the segment within the video. Similar approaches can be taken to identify the length/duration of the trailer.

Because segments of interest can overlap, simultaneous loops comprising operations 312, 314, and 316 can exist in an overlapping fashion, each triggered by an appropriate application of operation 310.

Operation 318 ends the loop for the duration of the video.

Operation 320 ensures the metadata (e.g., attribute-value pairs) collected on the video and/or segments of interest are stored in one or more appropriate data stores.

The method ends at operation 322.

Creating and Using a Highlight Video Description

A dynamic highlight video is created using a highlight video description as described herein. A highlight video description is a data structure, file, and/or other entity that contains information that the system can use to create the dynamic highlight video. For example, a highlight video description comprises metadata in the form of attribute-value pairs that allows the segments which make up the dynamic highlight video to be identified. The highlight video description can also comprise information comprising the play order of the video segments or information from which the play order can be derived. The highlight video description can also comprise other metadata that allows the user to be informed of other information related to the highlight video, the video segments that make up the highlight video with their play order, the videos from which segments were drawn, and so forth.

An example data structure is presented below. In this example, the data structure comprises the actual video segments that make up the highlight video definition and their associated play order. It is a simple example with segments drawn from two videos. The segment metadata comprises a segment title, a start time, and a stop time. Other embodiments may use different formats, have different metadata, and so forth.

```
{
"videos": [
    "videoTitle": "Riding the Dalton Highway to Dead Horse",
    "videoSource": "https://www.youtube.com/watch?v=marOlaFt8J8",
    "Description": "Motorcycle trip from Fairbanks to Prudhoe Bay along the Dalton Highway.",
    "publishDate": 16/09/2018,
    "contentOwner": "Sea Land Adventurer",
    "segments": [
        {
            "segmentPlayOrder": 1
            "segmentSummary": "Day One",
            "startTime": 1:54
            "endTime": 2:32
        },
        {
            "segmentPlayOrder": 2
            "segmentSummary": "Day Two",
```

```
            "startTime": 11:38
            "endTime": 12:45
        },
    ],
    "videoTitle": "Alaska Motorcycle Trip",
    "videoSource": "https://www.youtube.com/watch?v=XOMHe7Sm5VY",
    "Description": "Mike, Karl, Matt and Brad share their motorcycle adventure
from San Diego to Alaska.",
    "publishDate": 10/11/2017,
    "contentOwner": "SailingVesselCalypso",
    "segments": [
        {
            "segmentPlayOrder": 3
            "segmentSummary": "San Diego",
            "startTime": 0:54
            "endTime": 1:32
        },
        {
            "segmentPlayOrder": 4
            "segmentSummary": "Border Crossing",
            "startTime": 3:38
            "endTime": 4:15
        },
        {
            "segmentPlayOrder": 5
            "segmentSummary": "Lake Louise Campground",
            "startTime": 5:07
            "endTime": 6:22
        }
    ],
  ]
}
```

As described herein, the highlight video description can be created programmatically, in an interactive fashion, and/or some combination thereof.

Figure 4:
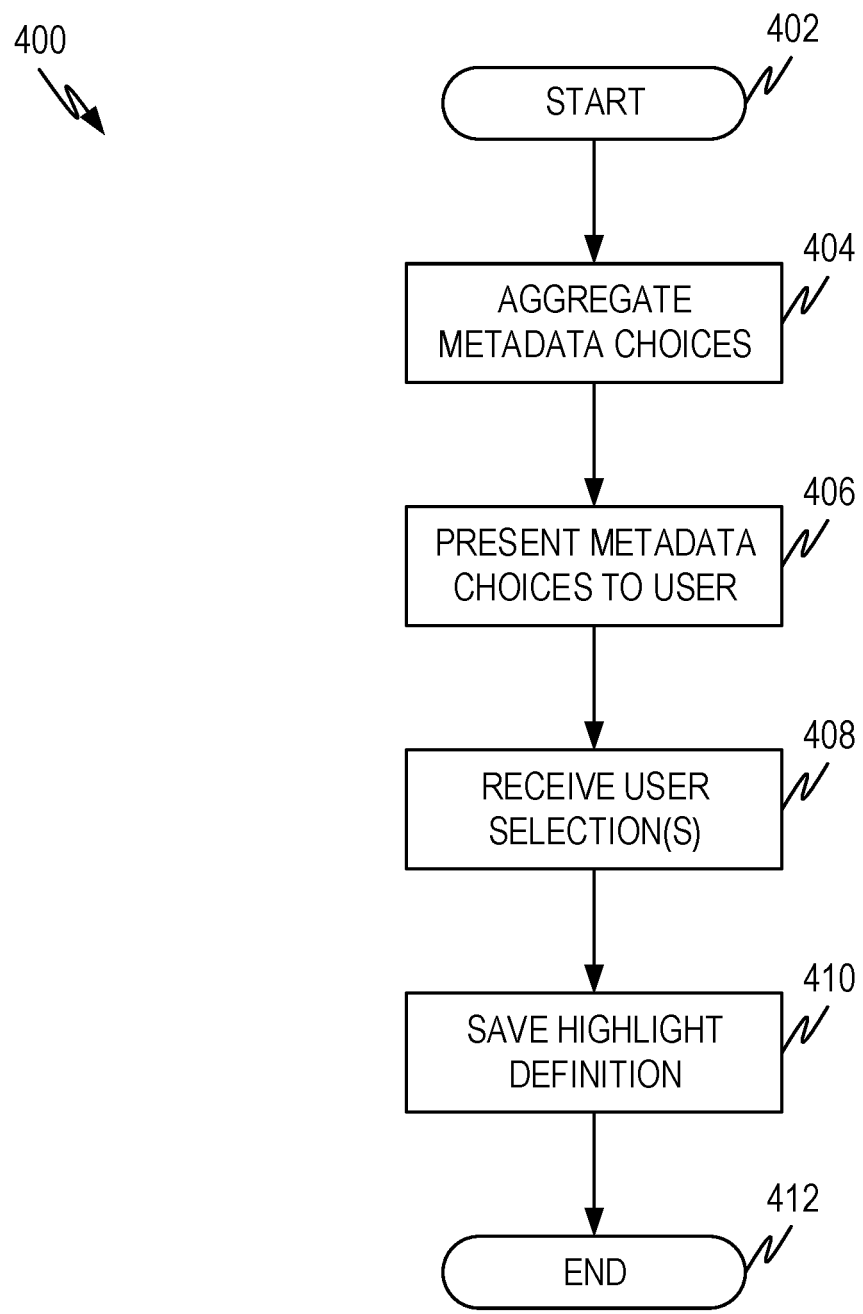
FIG. 4 illustrates an example flow diagram depicting interactive creation of a highlight video description according to some aspects of the present disclosure.

FIG. 4 illustrates an example flow diagram 400 depicting interactive creation of a highlight video description according to some aspects of the present disclosure. The method begins at operation 402 and proceeds to operation 404. Operation 404 aggregates metadata choices. This means that metadata attributes and values for the attributes are collected and aggregated. For example, if the metadata data store contained the metadata attributes and values illustrated the data structure above as a representative example, the aggregated metadata attributes and their associated values are given in the table below:

TABLE 1

Aggregated Metadata Attributes and Values

| Metadata Attribute | Attribute Values |
|---|---|
| videoTitle | "Riding the Dalton Highway to Dead Horse" |
|  | "Alaska Motorcycle Trip" |
| videoSource | YouTube |
| Description | "Motorcycle trip from Fairbanks to |
|  | Prudhoe Bay along the Dalton Highway." |
|  | "Mike, Karl, Matt and Brad share their |
|  | motorcycle adventure from San Diego to Alaska." |
| publishDate | 16, Sep. 2018 |
|  | 10, Nov. 2017 |
| contentOwner | "Sea Land Adventurer" |
|  | "SailingVesselCalypso" |
| segmentSummary | "Day One" |
|  | "Day Two" |
|  | "San Diego" |
|  | "Border Crossing" |
|  | "Lake Louise Campground" |

TABLE 1-continued

Aggregated Metadata Attributes and Values

| Metadata Attribute | Attribute Values |
|---|---|
| segmentLength | 0:38 |
|  | 1:07 |
|  | 0:38 |
|  | 0:37 |
|  | 1:15 |

As noted in the table, aggregated metadata attributes can be either taken directly from the metadata such as vidoTitle, Description, publishDate, and so forth. Additionally, or alternatively, the aggregated metadata attributes can be derived from collected metadata attributes. For example the videoSource attribute in table 1 lists only the service name and not the corresponding website where the videos can be found and the segmentLength attribute is not in the example data structure but is derived from the startTime and endTime. Finally, some metadata attributes can be dropped and not presented.

Derived metadata attributes can be useful when the collected metadata attribute will be less useful to a user than the derived attribute. For example, a list of aggregated startTimes is likely of little use to a user. However, a list of segment lengths may be more useful to allow a user to select segments of a desired length. Similarly, the service where videos are found may be of more interest to the user than an aggregated list of URIs.

In some embodiments, the derived metadata attributes can be presented along with the metadata attributes they are derived from. In still other embodiments, the base metadata attributes and/or the derived metadata attributes can be presented in groups or "bins". For example, the aggregated segment lengths can be converted into ranges such as "less than 1:00," "1:00-2:00," and so forth, his allows the user to more quickly grasp some types of metadata attributes and identify the attributes of interest.

In still other embodiments redundant values for a single attribute can be eliminated. For example, consider a series of videos of sporting events. In some sports it is not uncommon for two teams to meet multiple times in a given season. Thus, if the Colorado Rockies play the Atlanta Braves twelve times in a given season, and the videos are titled by the two teams (e.g., Colorado vs. Atlanta), there is no need to repeat the value "Colorado vs. Atlanta" twelve separate times.

In other embodiments, certain metadata attributes can be eliminated from the aggregated metadata list all together. For example, some metadata attributes that are collected may be utilized for purposes related to how the system works and which would not be of interest to a user in identifying segments of interest. For example, metadata that is collected may comprise details in how a particular service should be accessed such as API names, parameters, and so forth. Although such is metadata, it would not be of interest to a user identifying segments of interest. Thus, such metadata may simply be ignored and not be aggregated as part of operation 404.

With aggregated metadata attributes and values, a user interface can be crafted for presentation to a user so the user can identify what segments are of interest. Operation 406 causes the presentation of an appropriate interface. In one representative example, metadata attributes can be presented for multiple selection, such as checkboxes, single selection, such as dropdown values, and other such user interface controls to allow a user to specify metadata attributes of interest. In this sense, the user interface allows a user to build an interactive query that will select the segments of interest.

In some instances, selection of one metadata attribute value may limit what attribute values are available in other attributes. For example, if a user selects videos from a particular video service, metadata attributes associated with videos from other attribute services can be removed from the user interface, as such would not make sense the context of selecting only videos from that particular video service.

Using selection mechanisms, the user can put together metadata attributes and corresponding values that will extract video segments of interest. For example, all video segments where the user RandomBoy fought the White Wizard on the Plains of Despair or that will extract video segments showing all home runs hit in Game 2 of the 2017 world series or that will show all travel video segments of the inside of the Cathedral of Notre Dame in 2018 from a particular video service.

In addition to, or as an alternative to, a user interface that allows a user to interactively build a query, the user interface can receive a text string in a natural language format, in a query language format, or in some other format that allows the user to express what the user wants to see. Thus, a user may simply enter "show all fights with the White Wizzard in Soul Catcher's Quest over the last three months" and the system can translate the user input query into an appropriate set of attributes and associated values to effectuate the user's desires.

Conversion of queries such as this are accomplished by a trained language understanding model. A language understanding model typically uses some form of machine learning and can be trained to receive the input query and convert the query into an intent and/or set of attributes that define what the user wants. For example, the query "show all fights with the White Wizard in Soul Catcher's Quest over the last three months" may be converted to an intent "SelectVideoSegment" and several entities: "White Wizard," "fight," "Soul Catcher's Quest." and "3 months." From this, the system can collect any further information that is needed and create an appropriate highlight video definition.

There are numerous descriptions of such language models and any can be used with appropriate training. Some can be built into the system while others are accessed as online services Microsoft® LUIS®. As those of skill in the art would understand how to select and train an appropriate language model, no further description is needed.

In yet another embodiment, a user can identify one or more areas of interest, and the system can select video clips according to selection criteria to create a custom highlight specific to their interests. In this embodiment, the system selects clips based on selection criteria such as popularity, user rating, most recent, and/or any other criterion in order to assemble a sequence of clips that will be most likely meet the user's desires. Thus, the system can intelligently select clips without the user needing to specify all criteria and adjust them to fit a set of parameters such as run length, average clip length, number of clips, and/or so forth.

As discussed herein, rather than the clips being automatically assembled, the clips can be presented to the user from one or more sources and users can select which clips should be included. This could span multiple videos so that a user can construct a mash-up of video from many sources comprising clips that are entirely chosen by the user. In some embodiments, with permission of the content creator, such clips can also be stored by the user in an offline or online collection and used as a repository of interesting moments that can be used to create a multitude of subsequent custom highlight collections. Such collections can be shared with other users to create vast repositories of interesting moments, a palette from which many unique custom videos can be created. A user can also identify an interesting moment generated by the various classification mechanisms and save it to their repository for future reuse.

Where such "private" clip repositories exist, metadata about the private repository clips can be aggregated. Then the creation process described herein can search the private metadata repositories, search the "public" metadata repositories, or both when creating highlight video definitions as described herein.

Although not specifically shown, the interactive and/or query interfaces can present to the user information that describes what the highlight video that is created from the highlight video definition will be like. For example, a query such as "all travel video segments of the inside of the Cathedral of Notre Dame in 2018" may pull thousands of video segments and, when these segments are assembled, produce a video with a run time of several days. Thus statistics such as the number of video segments that will make up the highlight video, total run time, average video segment length, and so forth may help a user refine the user's query to put together an appropriate highlight video definition that has segments of interest, but also meets other desired parameters such as overall run length. Moreover, segments can be ordered via scores that relate the confidence of the classifier, the specificity of the segment to the desired category of interest, the intensity or excitement of the segment, etc. This allows the user to further refine the highlight to only include "the most exciting goals" or "the prettiest views in Notre Dame".

Thus, as a user selects attributes, a query can be created. The created and/or entered query (e.g., where a user enters a query through the user interface), can be run against the metadata data store(s) to dynamically identify the segments that are selected by the query.

Although not explicitly shown in the flow diagram, the user can request previews of any combinations of video segments either before or after the highlight video definition is created. For example, a user's query may select a candidate pool of video segments and a user may desire to review one or more before deciding whether any particular video segment should be included in the video highlight definition. When previewing a video segment, the user can indicate a segment should be included or excluded. Additionally, or alternatively, the user can adjust metadata associated with the segment and/or provide other feedback.

Because metadata is automatically collected by machine learning and other techniques, errors can occur in the metadata due to imperfectly trained machine learning models, unanticipated cases, imperfect matching in the metadata, and/or for other reasons. As a user previews a segment, the user can modify metadata, add metadata, remove metadata, provide commentary on the segment, and/or make other adjustments, additions, deletions, and so forth. For example, a user may indicate that a particular segment is very interesting or not very interesting. This can be used to refine the highlight experience for subsequent users, to refine machine learning models, and/or any combination thereof. Similarly, users can indicate that the lead and trailing time around an interesting event is too long or too short. These inputs can provide an immediate refinement of the specific clip being viewed and can also provide a longer-term refinement of the classifiers and processes used to create similar future highlights.

In some embodiments feedback and/or metadata changes will not be used and/or applied until one or more conditions are met. For example, one condition may be that the number of people providing the same or similar feedback and/or metadata changes exceeds a threshold (percentage, absolute number, etc.). Until such a condition is met, the feedback and/or metadata changes is stored, but not applied. Other conditions can include acceptance by an "editor" or other authorized approver, quorum approval (e.g., a certain number of people in a particular group needs to approve before a quorum is achieved and approval granted), and so forth. Thus, the user adjustments and/or feedback can be used to adjust stored metadata, can be used to annotate metadata for training models, and/or any combination thereof. Conditions can be attached so that the feedback and/or adjustments are not used, or are only used for some purposes but not others, until one or more conditions are achieved.

Operation 408 receives the user selection of attributes/values and/or queries and converts them to an appropriate highlight video definition. This can include converting any entered query into a set of attributes/values as described. Conversion into a highlight video definition can include conversion into a standardized file and/or data structure format so that the highlight video definition can be consumed at a later time. Numerous such formats are known. The standardized format includes the attributes and corresponding values that allow identification of the corresponding segments to be identified. In another embodiment, the standardized format comprises a list of segments that make up the highlight video. In still another embodiment, both can be included in the standardized format highlight video definition.

The difference between the first two embodiments are in the first, the standardized format is a set of attribute-values that allow appropriate selection of video segments. Thus, the standardized format may include information that allows selection of appropriate video segments, In other words, the query definition that, when run against the metadata store(s), produces a list of segments that comprise the highlight video.

In the second embodiment, the actual selection process has occurred so that the standardized format of the highlight video definition is a list of segments that make up the highlight video along with the information needed to access the appropriate segment such as the location of the video containing the segment (service, URI, etc.), the location of the video segment within the video (start time, etc.), the length and/or stop time of the segment, the segment play order, and so forth. This allows for easy sharing of a dynamically-selected highlight clip via social media, email, instant messaging, and other means.

In the final embodiment, both the query definition and the resulting segment list can be included in the highlight video definition. The standardized format for the highlight video definition can comprise any of these in any combination.

Operation 410 saves the highlight video definition for later retrieval and use.

Figure 5:
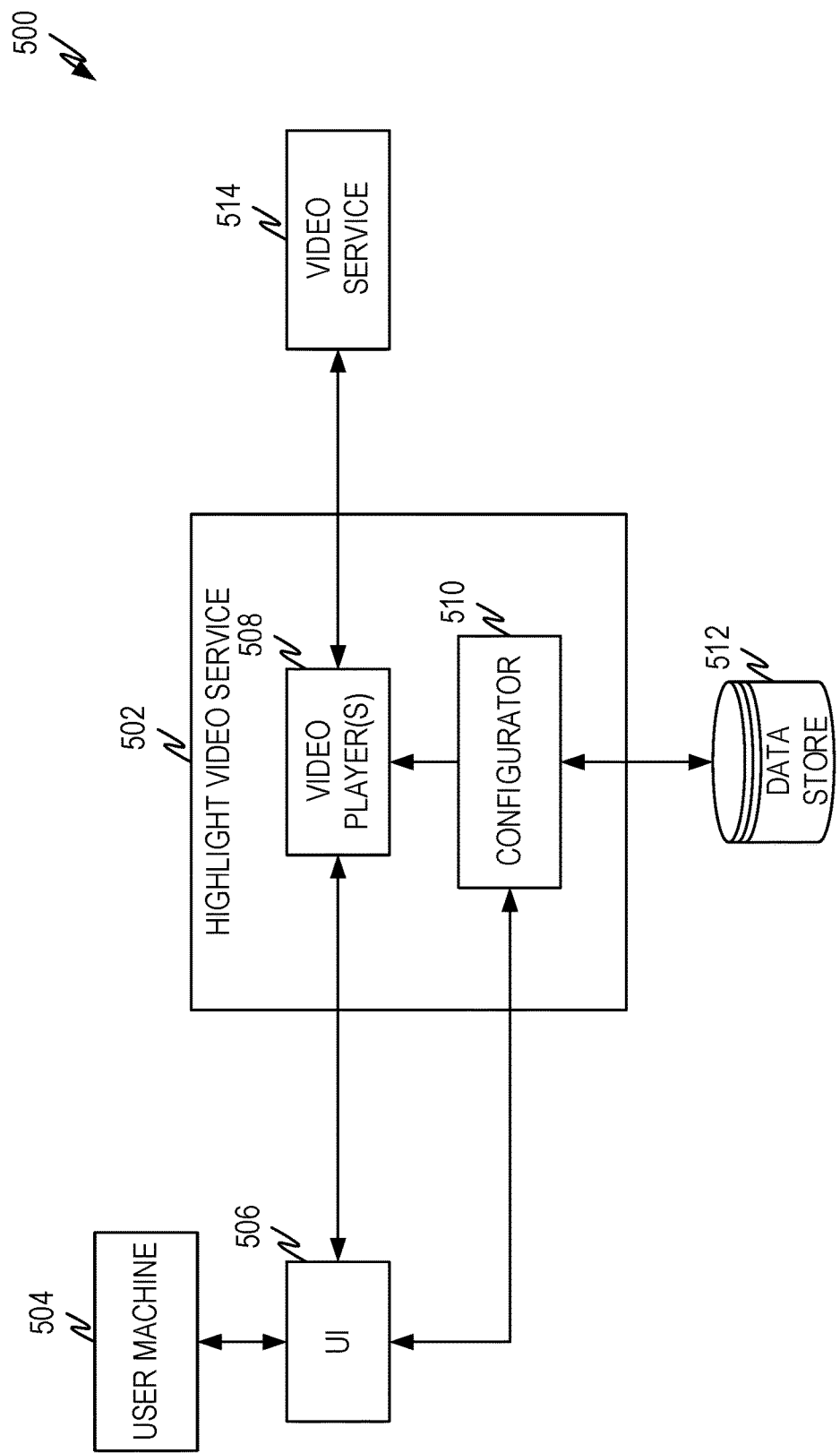
FIG. 5 illustrates a representative diagram for configuring a player and engaging playback according to some aspects of the present disclosure.

FIG. 5 illustrates a representative diagram 500 for configuring a player and engaging playback according to some aspects of the present disclosure. A highlight video service, also referred to as a summary service, 502 comprises a configurator 510, one or more video players 508, and has access to a data store 512, which stores one or more of collected metadata, aggregated metadata, and/or highlight video definitions.

A user interacts with the highlight video service 502 through a user machine 504 and an associated user interface 506, which can be a user interface as described above, an application, and/or so forth. Although the highlight video service 502 is shown as separate from the user machine 504, some or all of the aspects of the highlight video service 502 can reside on the user machine 504. For example, the configurator 510, video player(s) 508, and/or the data store 512 can reside on the user machine 504 in any combination. The highlight video service 502 would comprise the remainder of the aspects and/or methods to allow the user machine aspects to interact with the highlight video service 502.

The user interface 506 can allow the user to create a highlight video definition (e.g., as described in conjunction with FIG. 4), to playback a highlight video, to select a highlight video definition for playback, to manipulate/edit previously created highlight video definitions, and otherwise interact with the highlight video service 502 and/or video service 514.

The user can select, define, or otherwise identify a highlight video definition for playback. The video definition is presented to the configurator 510. If the highlight video definition contains only a query definition, the configurator 510, or another aspect, uses the query definition to create a segment playlist as described herein. The segment playlist comprises information that:

Identifies each segment to be played, including how and where each segment can be assessed. For example, name and/or location (e.g., URI) of the video containing the segment, the segment start time, and the segment length and/or stop time so the system knows when the segment ends.

Identifies the play order of the segment.

If multiple players are to be displayed simultaneously (see below), information that shows how segments that should be played simultaneously should be synchronized relative to each other.

During playback, the configurator 510 configures one or more video players 508 to playback the desired video segments in the desired order. This can include, passing to the player 508 information to access the video containing the segment to be played, the location within the video where playback should start (e.g., the segment start time) and where playback should stop (e.g., the segment stop time). If the players 508 do not have such capability, the configurator can monitor the playback and when playback reaches the segment reaches the end point, the configurator 510 can signal that playback should stop and configure the player to play the next segment in the segment playlist. If the players 508 have the capability, the configurator 510 can configure multiple segments at once.

The video players 508 interact with the video service 514 to access and play the current video segment. The video player 508 will access the video service 514 and request streaming of the first video starting at the location of the first video segment. The video player 508 will begin streaming the video at the specified location. When the video playback reaches the end of the segment, the video player 508 (or the video player 508 in conjunction with the configurator 510 as previously described) will request the video service 514 begin to stream the next video at the starting location of the next video segment. This continues until all video segments have been played in the desired order.

As previously described highlight video definitions can be stored for later use. Thus, there can be a time difference between when the highlight video definition is created and when the definition is utilized to perform playback of the series of video segments that make up the highlight video. Additionally, at least in some embodiments, the highlight video definition can contain a segment playlist as previously described. At the time the segment playlist was assembled into the highlight video definition, or at least when the metadata was aggregated, all segments were accessible and available at the appropriate video services. However, because of the time difference between when the video playlist was created (and/or when the metadata was collected and/or aggregated), there is the possibility that one or more of the video segments are no longer accessible at the video service(s) 514 at the time of playback.

Because of this issue, embodiments of the present disclosure can be programmed to handle missing and/or unavailable video segments. This can be accomplished in various ways. If the highlight video definition comprises the query definition, the segment playlist can be created/recreated and used. Another way that segment availability can be checked is that prior to initiating playback, the configurator 510 can attempt to access the video segments in the playlist either directly or through a properly configured video player 508. If an access error occurs, the configurator 510 can adjust the playlist and, in some embodiments update any playlist stored in the highlight video definition. In still another way, segment availability is not checked prior to initiating playback of the highlight video definition. Rather the configurator uses multiple embedded players such that as one segment is being played a second player is configured to access the next segment on the list without presenting any video content of the second player to the user. If an error occurs, the configurator 510 can skip that segment and adjust the segment playlist in the highlight video definition, if desired. In this way, the segments are checked just prior to when they will be played and on the fly adjustments can be made. Any one approach or any combination of these approaches can be used in any embodiments described herein.

During playback of a highlight video segment, either as part of playing of an entire highlight video or from viewing a segment in some other context, users can provide adjustments to metadata and/or feedback as part of the viewing experience. Thus, when the video from video players 508 is presented, the UI 506 (either of the video player, or a separate UI) can allow users to make adjustments to metadata and/or provide feedback. In some instances, the user interface can present selection options allowing a user to provide specific points of feedback or changes (e.g., clip is exciting or not exciting). In other instances, fields where a user can enter freeform information can be provided (e.g., entry field for a new title). In still other instances a combination of these approaches can be used.

The user input can be provided to the configurator 510 and/or another aspect of the highlight video service 502 in order to capture the adjustments to metadata and/or feedback. As described herein, the adjustments to metadata can comprise adding new metadata, removing existing metadata, and/or modifying metadata. As described herein, the adjustments and/or feedback can be used to adjust stored metadata, can be used to annotate metadata for training models, and/or any combination thereof. Conditions can be attached so that the feedback and/or adjustments are not used or are only used for some purposes but not others until one or more conditions are achieved.

The highlight video service 502 can be used in conjunction with other services. For example, highlight video service 502 can work in conjunction with a search service to serve example clips that are relevant to a user's search query. In a representative example, the user's search query and/or other information from the search service is used to search the data store 512 for clips relevant to the search query. The searching can be done by the search service, by the configurator 510, and/or by another system and/or service. The clips can be ranked by the same methods applied by the search system to identify the top N results of the clips.

One or more video player(s) 508 can be embedded into the search results page, either as part of the search results, in a separate area of the search results page, in a separate tab in the search results, and/or so forth. Metadata can also be presented in proximity to the embedded video players to describe the clips that will be played by the embedded players. The players can then be configured to play the corresponding video clip by the configurator 510 or similar configurator associated with embedded players of the results page. The players can then initiate playback of a corresponding video clip on an event such as the user hovering over a particular player, selection of a particular player, and/or so forth.

Figure 6:
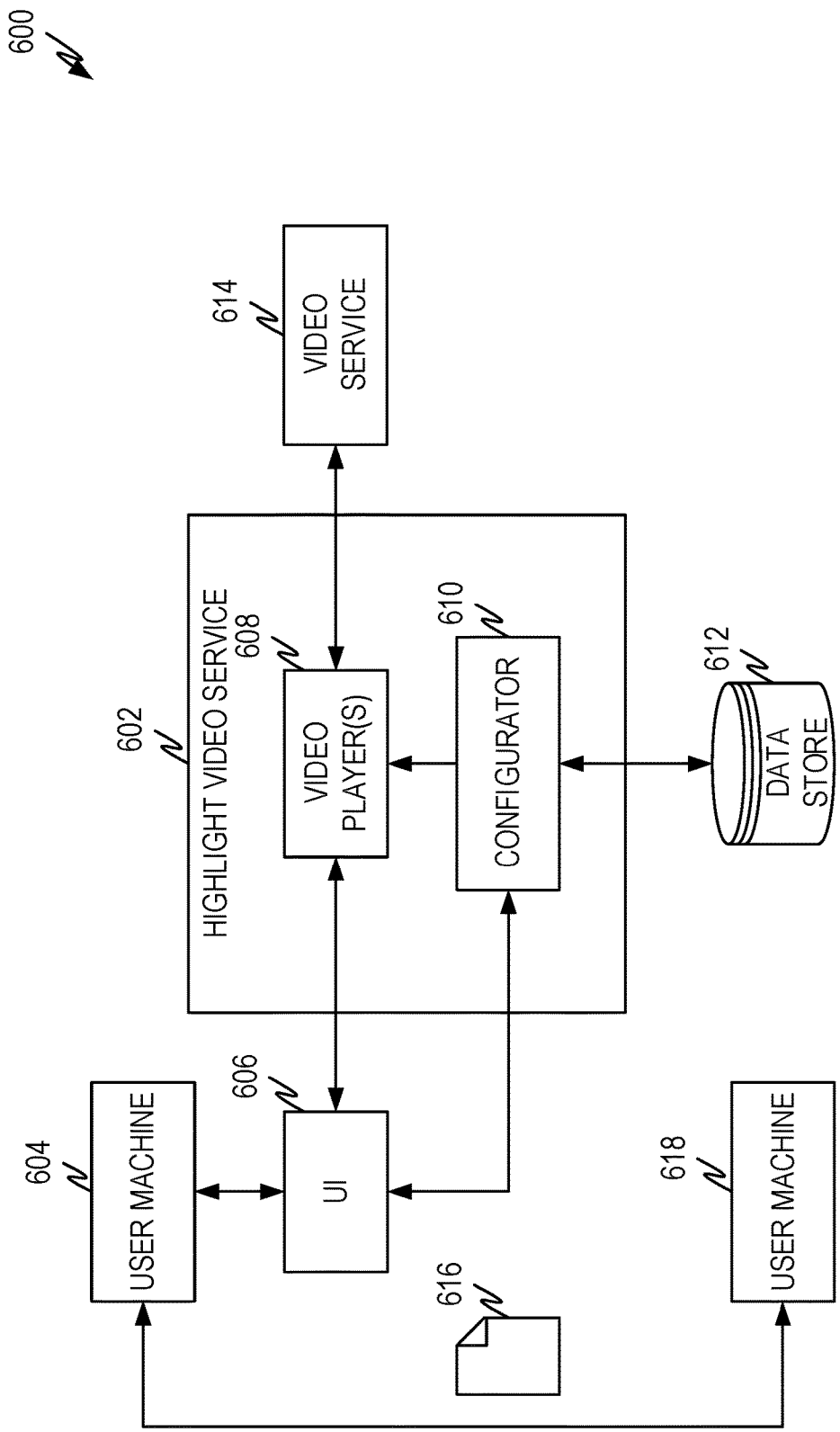
FIG. 6 illustrates an example diagram depicting sharing highlight video definitions according to some aspects of the present disclosure.

FIG. 6 illustrates an example diagram 600 depicting sharing highlight video definitions according to some aspects of the present disclosure. This diagram is similar to the diagram in FIG. 5 and operates as previously described, with the exception that in FIG. 6, highlight video definitions 616 can be exchanged between user machines 604 and 618. This shows that the highlight video definition 616 used by a user need not be created by that user. Because the highlight video definition 616 allows dynamic creation of a highlight video, the highlight video definitions can be stored, traded, surfaced, and so forth just as finished highlight videos could otherwise be. One advantage of the highlight video definition over an assembled highlight video is that since the highlight video definition only contains metadata (as opposed to video content itself), they can be hosted, stored, traded, and so forth with little risk of violating copyrights of the underlying video content. Where clips are stored to a repository as discussed above, the clips can be traded and shared with permission of the content creators so they can be used to create entirely new combinations.

For example, highlight video definitions can be indexed and hosted on a service, in a data store, and/or so forth so that users can search for highlight video definitions that have already been created. As another example, a peer-to-peer trading methodology can be established. In yet another example, an ad hoc sharing mechanism can be used. With little risk of infringing underlying video copyright, any of the sharing mechanisms that have traditionally been used to share content can be used to share highlight video definitions.

Determining Video Segment Play Order

Figure 7:
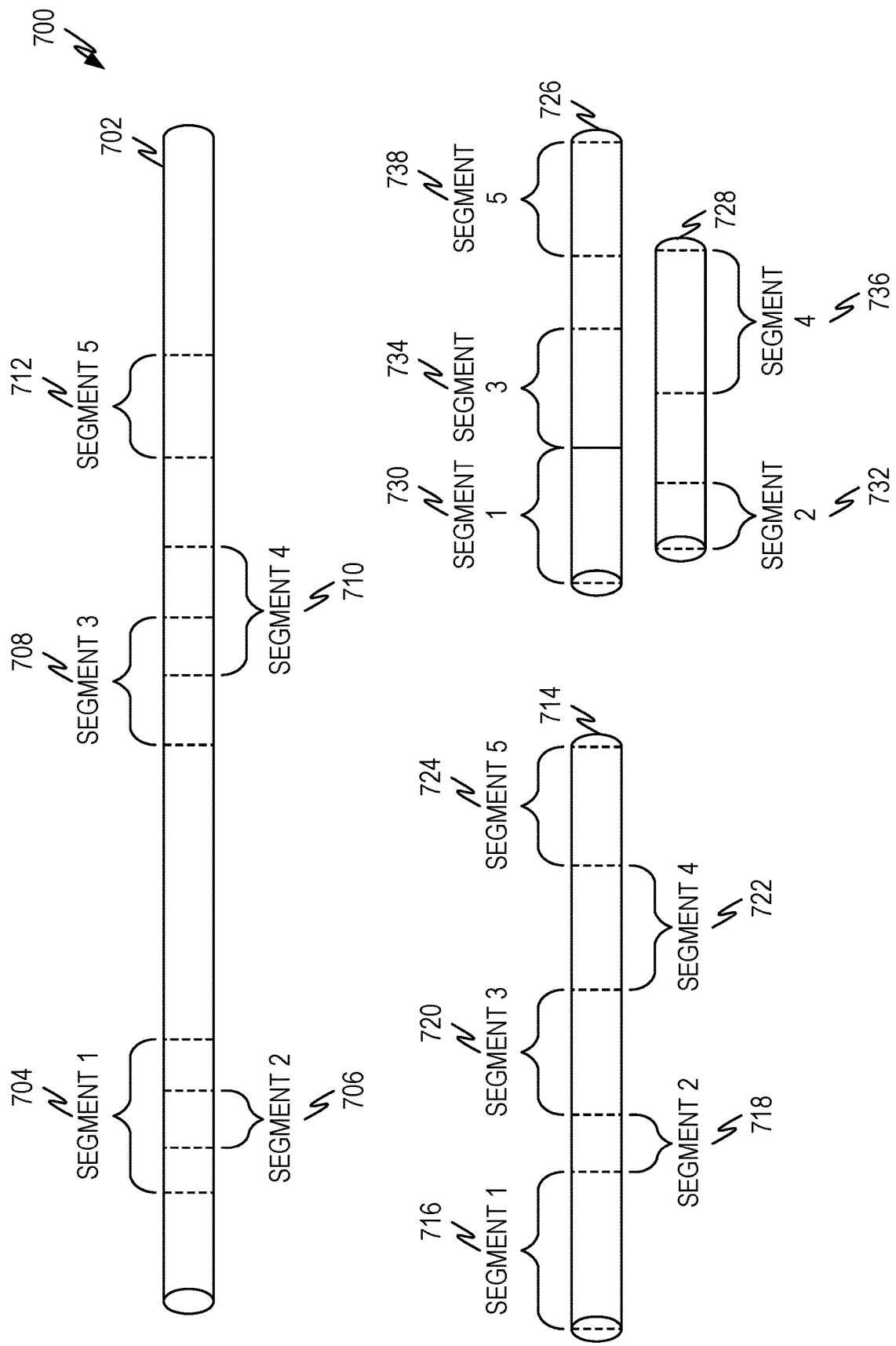
FIG. 7 illustrates an example of assembling segments according to some aspects of the present disclosure.

Once the video segments that will make up the segment playlist are identified, a segment play order must be created. FIG. 7 illustrates an example 700 of assembling video segments into a playlist order according to some aspects of the present disclosure. Video 702 represents the underlying video from which five different video segments, labeled segment 1 through segment 5, are drawn. When there is no overlap between video segments in a single video 702, the segment order is easy to determine. In such a situation, it often makes sense to simply present the segments in the order that they occur in the video.

However, when the video segments overlap, determining an appropriate video order can be more complicated. In the representative example of FIG. 7, different forms of segment overlap are illustrated. Thus, segment 2 706 is fully contained within segment 1704, in that the start time for segment 2 706 occurs after the start time of segment 1 704 and the end time of segment 2 706 occurs before the stop time of segment 1 706. Segment 3 708 and segment 4 710 show an overlap pattern where the start time of segment 4 710 occurs after the start time of segment 3 708, but the end time of segment 4 710 occurs after the end time of segment 3 708. Finally, segment 5 712 does not overlap with any other segment.

One approach to such overlapping segments is to use a single video player and sort the segments into a play order using an attribute of the segments. For example, the segments can be sorted by start time and played in start time order. This is illustrated in the lower left of FIG. 6 where the start times of segment 1-segment 5 occur in the order of segment 1 716, segment 2 718, segment 3 720, segment 4 722, and segment 5 724. Thus, the segments are ordered according to start time without regard to any overlapping material and played in start time order, one after the other. Ordering by any other metadata attribute is also possible. For example, stop time order or any other attribute could also be used.

A second approach to overlapping material is illustrated lower right of FIG. 6. Multiple players can be used to play the segments in a synchronized manner according to one or more segment attributes. For example, time-synchronized according to start time. Thus, because there are at most two overlapping segments in this example, two players are used. The two players are synchronized to show the same video during periods of overlap. Thus, the first player 726 would begin to play segment 1730. As the start time for segment 2 732 arrives, segment 2 begins playing in a synchronized manner on the second player 728. The synchronized play would continue until the end time of segment 2, after which the segment 2 playback would be stopped on the second player 728.

At the end of segment 1730, the first player 726 would begin playing segment 3 734. At the start time of segment 4 736, the second player 728 would begin playing segment 4 736. In this overlap situation the end of segment 3 734 occurs before the end of segment 4 736, so the first player 726 would stop playing segment 3 734 at the appropriate stop time and the second player 728 would continue to play segment 4 736 until the stop time for that segment was reached.

At this point, segment 5 738 would begin playing on the first player 726 until it was finished.

In this second approach, multiple players allow for separate identification (which segment is playing), annotation using segment metadata or other captioning (see below), and/or so forth of the different overlapping segments. However, since during the overlapping segments, the video played on both players is identical and it is only the labeling, annotation, and/or so forth that are different, a single player can be used with the overlapping segment's labeling, annotation, and/or so forth being added to the video during the overlapping periods.

How this would work is that the single player would begin to play segment 1 at its start time and display annotations, labeling, and so forth from segment 1. At the segment 2 start time, the annotations, labeling, and so forth from segment 2 are additionally displayed. When the end time of segment 2 is reached, the annotations, labeling, and so forth from segment 2 are removed, leaving only the annotations, labeling, and so forth from segment 1.

When segment 1 ends, segment 3 begins to play along with the annotations, labeling, and so forth from segment 3. At the start time of segment 4, the annotations, labeling, and so forth from segment 4 are added. When the stop time for segment 3 occurs (which is before the stop time of segment 4), the annotations, labeling, and so forth associated with segment 3 are removed leaving only those for segment 4. At the end time of segment 4, segment 5 begins to play with its annotations, labeling, and so forth.

This last is not explicitly illustrated but can be readily understood from the included description and the illustrations of FIG. 7.

Figure 8:
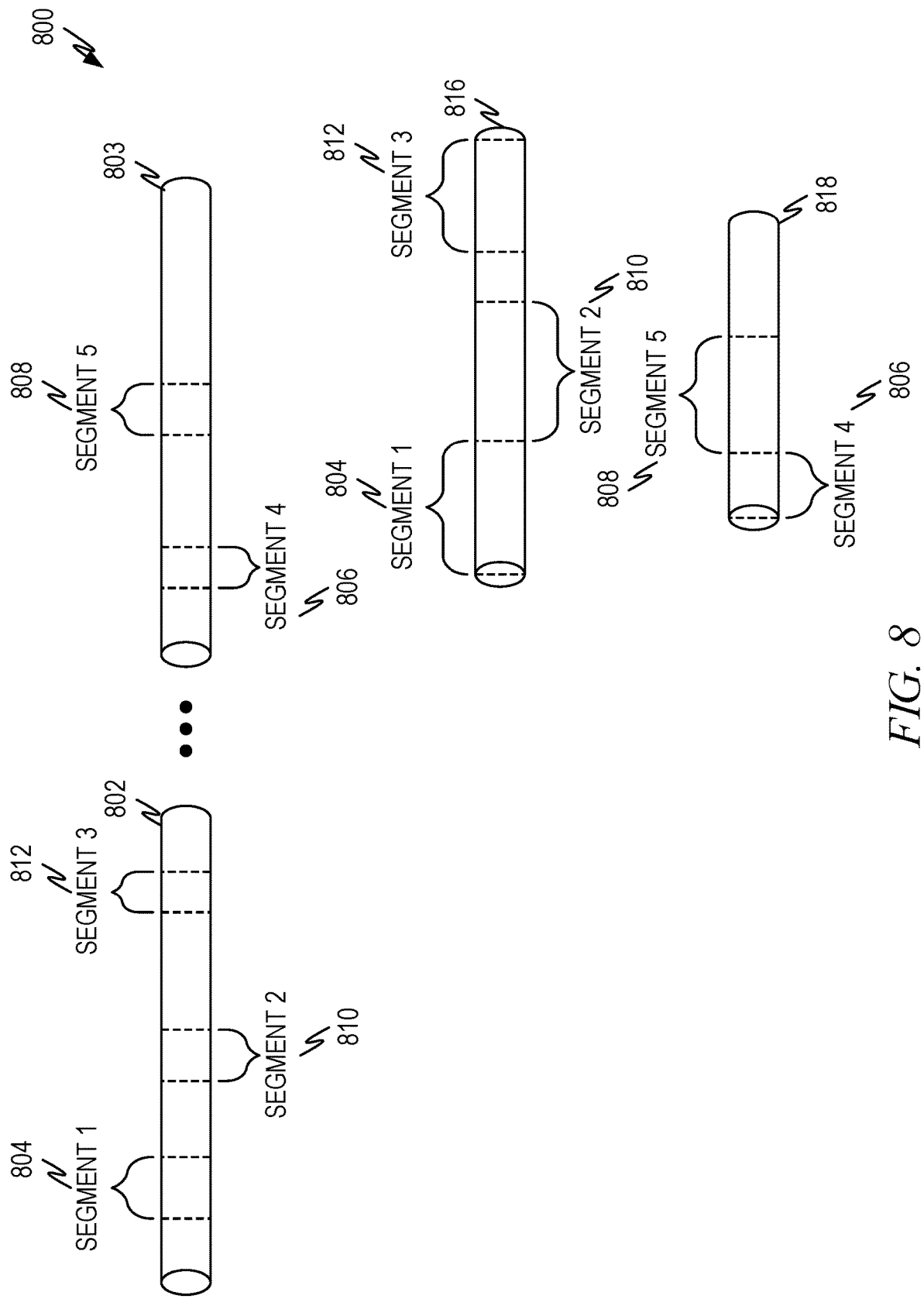
FIG. 8 illustrates an example of assembling segments according to some aspects of the present disclosure.

Video segments can come not only from one video, but from multiple videos. FIG. 8 illustrates an example 800 of assembling segments from multiple videos according to some aspects of the present disclosure. In this situation, the first video 802 comprises three segments: segment 1 804, segment 2 810, segment 3 812. The second video 803 comprises two segments: segment 4 806 and segment 5 808. No overlap is shown but overlapping segments can be handled as discussed in conjunction with FIG. 7, adjusted for segments from multiple videos.

If a single player is used, one or more attributes of the segments can be used to sort the segment into a play order. For example, the segments can be sorted in start time order, stop time order, or according to any other attribute or to scores associated with the various attributes as pertains to the specific segment. Sorting in start time order would result in a play order of segment 1 804, segment 4 806, segment 2 810, segment 5 808 and segment 3 812.

The segments can also be sorted by a primary, secondary, tertiary, and so forth attributes. For example, sorting the segments first by some attribute of the video and then by some attribute of the segment. For example, the videos can be sorted by date (oldest to newest or vice versa), then the segments sorted by start time. This would result in a play order of segment 1 804, segment 2 810, segment 3 812, segment 4 806, and segment 5 808, assuming the first video 802 was sorted before the second video 803. Any combination of metadata attributes can be used to sort segments into a play order.

Such a mechanism can also be extended to multiple simultaneous players. For example, assuming two players 816 and 818, on video's segments can be played on one player and the other on the other player. Thus, segment 1 804, segment 2 810, and segment 3 812 can be played on player 816 and segment 4 806 and segment 5 808 can be played on player 818.

When multiple players are used, playback can be synchronized between the players or left unsynchronized. For example, start time (or another attribute) can be used to synchronize when the two players will play the segments. In yet another example, the segments for each player are unsynchronized and each player plays the segments in play order for that player.

Multi-Layered Player Interface

Figure 9:
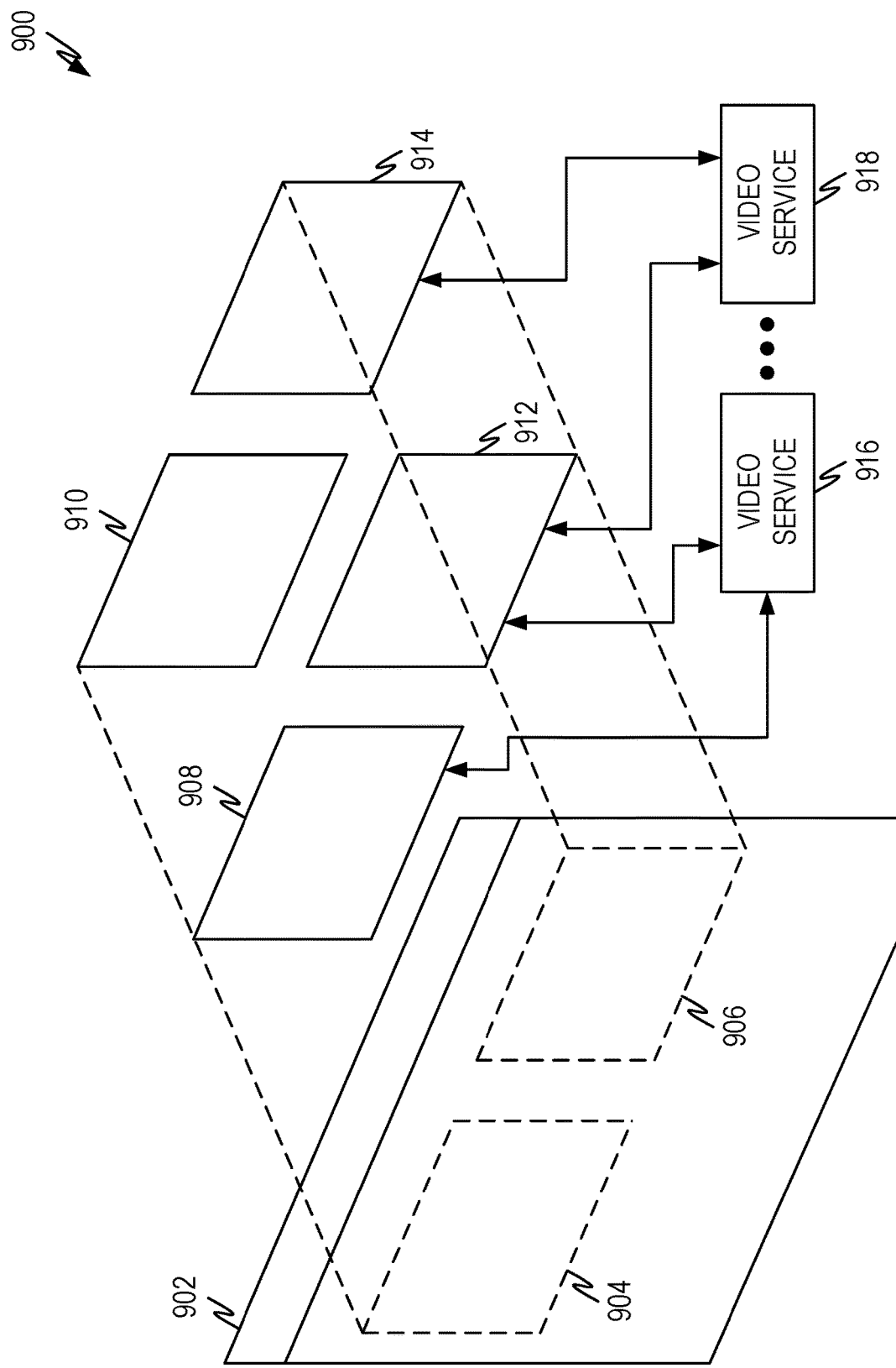
FIG. 9 illustrates a representative layered user interface with embedded players according to some aspects of the present disclosure.

FIG. 9 illustrates a representative 900 layered user interface 902 with embedded players according to some aspects of the present disclosure. In this embodiment, the user interface 902 used to present video segments of a highlight video to the user can comprise one or more players 908, 910, 912, 914 that present video in one or more regions 904, 906 of a user interface 902. It is commonly known that user interfaces can have multiple stacked layers that overlay one another in a "z" direction on a display device (i.e., normal to the display on the device). These different layers are presented through a "top" layer 902. Content in any particular layer can be made visible by revealing and hiding areas of intervening layers. For example, if the content from player 908 is to be presented in area 904 of the user interface 902, the area 904 can be made transparent or "invisible" so that the "visible" area in the layer with player 908 is revealed. Similarly, the content from player 910 can be made my making the area 904 and player 908 invisible or transparent.

Rather that making areas transparent and non-transparent, the content from one layer can be moved from one layer to another so it is on "top" of content from other layers. Thus, revealing the content from player 910 may be implemented by bringing player 910 from the "back" layer to the "top" layer, so that it hides content from the other layers.

The specifics of how revealing content from one layer and hiding content from other layers is implemented often depends on the particularities of the operating system, the application, or both. However, with this description, those of skill in the art will understand how to utilize the implementation of the particular operating system and/or application to implement the hiding and revealing behavior that is described herein.

The multiple players stacked behind one another and/or side by side can help remove or mitigate buffering and/or download issues. Additionally, the multiple players can be used to test availability of video segments as previously described.

Suppose a single video has multiple segments that are to be shown. Two different players 912, 914 can connect to the video service 918 where the video resides. One player 912 can queue up the first video segment and the other player 914 can queue up the second video segment. Thus, the output of the first video player 912 can be revealed in the user interface 902 and the first video segment played. While that occurs, the second video player 914 can queue up the second video segment. When the first video segment finishes, the output of the second video player 914 can be revealed in the user interface 902 while the output of the first video player 912 is hidden. The second video segment can be played while another video segment, either from the same video service 918 or a different video service 916 is queued up for playing on the first video player 912 after the second video segment is finished (e.g., by revealing the output of the first video player 912 and hiding the output of the second video player 914). This can continue, going back and forth between the video players, alternatively showing and hiding their output until all segments in the segment playlist are presented and played. In this way, the buffering and/or setup delays can be removed or lowered by taking place while the previous segment is being played.

Multiple players can also be used where both of their output can be presented in different areas of the user interface 904, 906. Thus, rather than switching players in "depth," players can be switched in "breadth." Furthermore, multiple combinations thereof can be used. Thus, two players with the ability to present simultaneous output (e.g., in areas 904 and 906) can be used to present simultaneous segments such as discussed in conjunction with FIG. 7 and FIG. 8 above. Additionally, the multiple "depth" players can be used to reduce or eliminate perceived delays with buffering and so forth as explained above.

The configurator of the service (or another method) can be used to implement video player switching as described.

Dynamic Captioning

Figure 10:
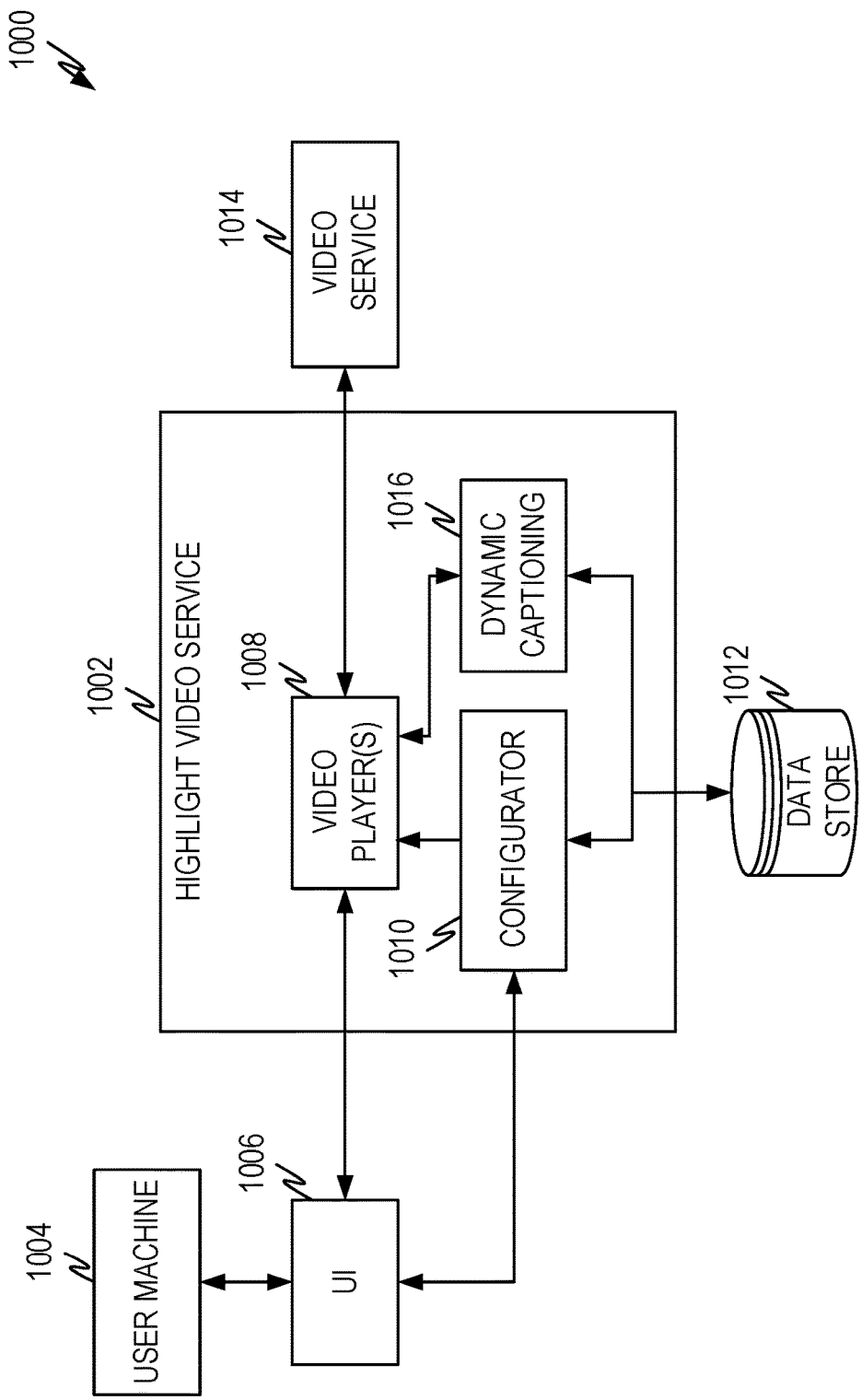
FIG. 10 illustrates an example diagram depicting dynamic captioning according to some aspects of the present disclosure.

FIG. 10 illustrates an example diagram 1000 depicting dynamic captioning according to some aspects of the present disclosure. The metadata attributes and values can be used to create dynamic captions for video segment playback. Thus, the highlight video service 1002 can have not only one or more video players 1008, and a configurator 1010, but also a dynamic captioner 1016. Dynamic captioner 1016 examiner metadata for the segment(s) being played and adds appropriate titles, captioning, annotations, and other such information. For example, the segment metadata can comprise a video title from which the segment is drawn, a segment title, video and/or segment descriptions, the video service where the video and/or segment resides, a particular value of one or more data point(s) such as "third goal" or "three kills in 30 seconds", a data visualization of one or more data point(s) at that moment or over time e.g. as a histogram, and so forth. These can be presented individually or in any combination. All these will be referred to herein as captioning and/or captioning attributes.

The dynamic captioner 1016 identifies what to display, where to display it, and when to display it. Some of the locations may be fixed by the user interface. For example, the user interface (such as user interface 902) may have defined locations for the video and/or segment title, video and/or segment description and so forth. Thus, the dynamic captioner will cause display of the appropriate information in the designated locations.

In other embodiments, and/or for other captioning attributes, the dynamic captioner may place one or more captioning attributes according to hints associated with the attributes. For example, it may be desirable to highlight something in the video that is not easy to see in the context of the video. A good example of this is that it is well known that a video of a flying golf ball can be difficult to discern against a sky background. The metadata collection and analysis method, such as described previously, can be trained to identify the location of a golf ball in a video clip, such as through image recognition techniques previously described. The metadata collection process can produce hints that are saved within the metadata that can be used by the dynamic captioner 1016 to highlight items that may otherwise escape a user's notice. The highlights can move from frame to frame as the item moves.

Furthermore, image recognition models exist that identify the content of an image and/or video frame. These image recognition models can be used as part of the metadata collection process to produce captions along with data that describes when the caption should be displayed and/or where the caption should be displayed. The dynamic captioner 1016 can retrieve that information and use it to present the captions at the proper time and for the proper duration in the proper location. For example the image recognition module may recognize a dog coming into the frame of a video and, by examining successive video frames, identify where the dog moves in the frame and when it leaves the frame. This information can be captured as part of the metadata (e.g., caption: "Dog," Location: <location within the frame>) and then used by the dynamic captioner 1016 to place the caption at an appropriate location within the video frame.

Example Machine Architecture and Machine-Readable Medium

Figure 11:
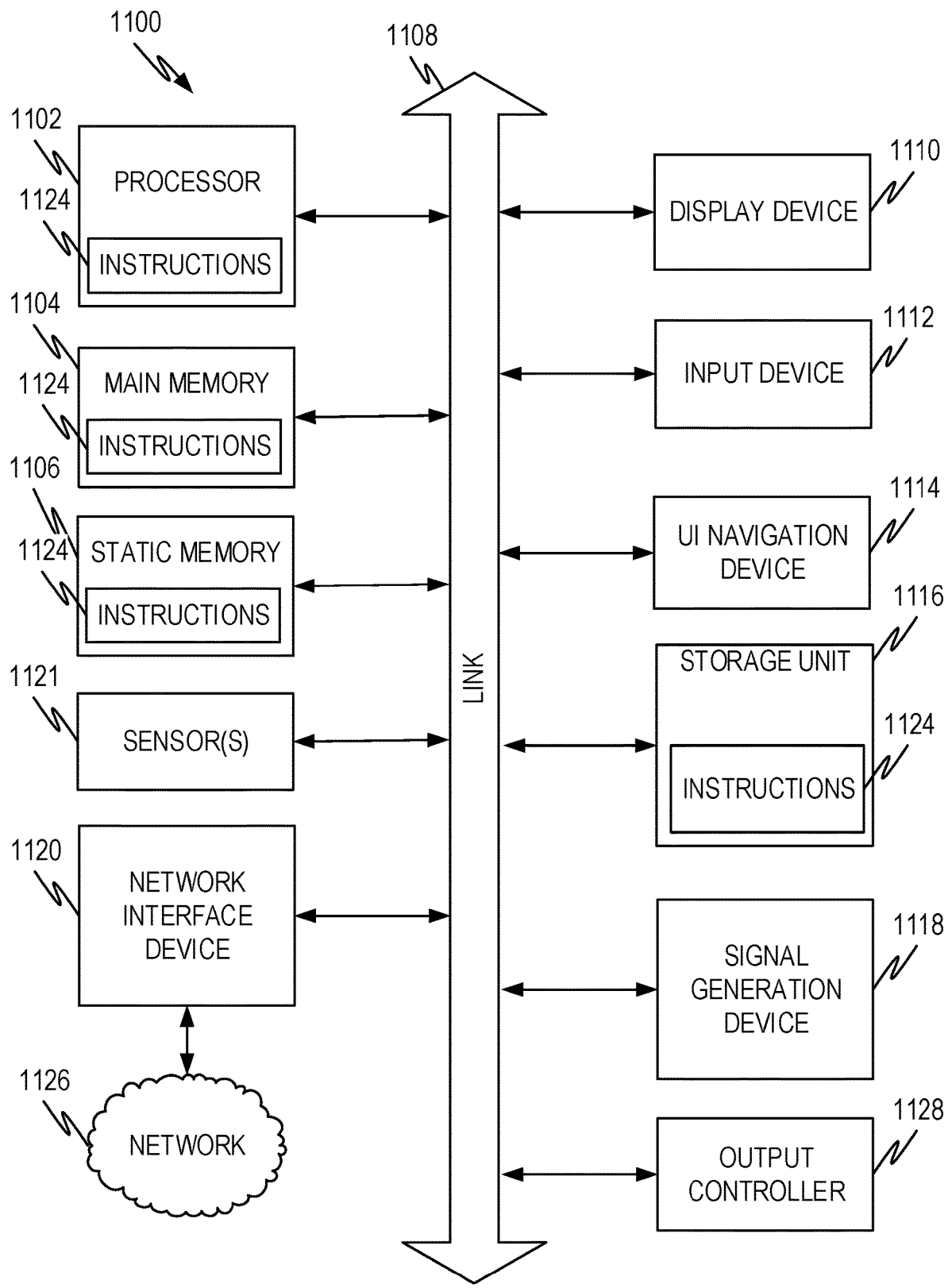
FIG. 11 illustrates a representative architecture for implementing the systems and other aspects disclosed herein or for executing the methods disclosed herein.

FIG. 11 illustrates a representative machine architecture suitable for implementing the systems and so forth or for executing the methods disclosed herein. The machine of FIG. 11 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 11 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1100 includes at least one processor 1102 (e.g., a central processing unit (CPU), a graphics processing unit (GPU), advanced processing unit (APU), or combinations thereof), one or more memories such as a main memory 1104, a static memory 1106, or other types of memory, which communicate with each other via link 1108. Link 1108 may be a bus or other type of connection channel. The machine 1100 may include further optional aspects such as a graphics display unit 1110 comprising any type of display. The machine 1100 may also include other optional aspects such as an alphanumeric input device 1112 (e.g., a keyboard, touch screen, and so forth), a user interface (UI) navigation device 1114 (e.g., a mouse, trackball, touch device, and so forth), a storage unit 1116 (e.g., disk drive or other storage device(s)), a signal generation device 1118 (e.g., a speaker), sensor(s) 1121 (e.g., global positioning sensor, accelerometer(s), microphone(s), camera(s), and so forth), output controller 1128 (e.g., wired or wireless connection to connect and/or communicate with one or more other devices such as a universal serial bus (USB), near field communication (NFC), infrared (IR), serial/parallel bus, etc.), and a network interface device 1120 (e.g., wired and/or wireless) to connect to and/or communicate over one or more networks 1126.

Executable Instructions and Machine-Storage Medium

The various memories (i.e., 1104, 1106, and/or memory of the processor(s) 1102) and/or storage unit 1116 may store one or more sets of instructions and data structures (e.g., software) 1124 embodying or utilized by any one or more of the methodologies or functions described herein. These instructions, when executed by processor(s) 1102 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices, magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Example Embodiments

Example 1

A method for assembling a highlight video, comprising:
accessing a highlight video definition comprising a plurality of metadata comprising attributes that:
identify a video and an associated location to access the video;
identify a plurality of video segments within the video;

determining a segment play order for the plurality of video segments based on the segment metadata;

creating a dynamic video highlight without assembling the plurality of video segments into a single video through operations comprising:

beginning with a first segment and continuing with remaining segments in segment play order:

accessing the video at a location associated with a segment to be played;

presenting the video to a user until the segment to be played is complete;

selecting a next segment in the segment play order.

Example 2

The method of example 1 wherein the video is presented through an embedded video player.

Example 3

The method of example 1 or 2 further comprising:

accessing a set of metadata from a metadata collection agent, the set of metadata comprising attributes that:

identify each video of a plurality of videos and a service to access each video; and identify at least one video segment in each video;

identify at least one event that occurs in each video segment;

causing presentation of a user interface allowing selection of metadata attributes, exclusion of metadata attributes, entry of a query, or any combination thereof:

receiving selection of metadata attributes:

based on the selection, creating the highlight video definition.

Example 4

The method of example 3 further comprising storing the highlight video definition, storing specific segments and clips either identified by machine classification or by a user, or both for later distribution to other users.

Example 5

The method of example 3 further comprising sending the highlight video definition to another user.

Example 6

The method of example 3 wherein the user interface further provides for selecting specific segments of a video, and wherein the highlight video definition comprises information identifying the selected segments.

Example 7

The method of example 1, 2, 3, 4, 5, or 6 wherein creating the dynamic video highlight further comprises:

instantiating a plurality of video players;

presenting a current video segment using a first of the plurality of video players; and presenting a next video segment using a second of the plurality of video players.

Example 8

The method of example 6 wherein presentation of the current video segment and the next video segment occurs in an overlapping fashion.

Example 9

The method of example 6 wherein presentation of the current video segment and the next video segment occurs in a sequential fashion.

Example 10

The method of example 1, 2, 3, 4, 5, 6, 7, 8, or 9 wherein the location is a remote video streaming service.

Example 11

The method of example 1, 2, 3, 4, 5, 6, 7, 8, 9, or 10 wherein the location is local.

Example 12

The method of example 1, 2, 3, 4, 5, 6, 7, 8, 9, 10, or 11 wherein the plurality of metadata attributes further comprises attributes that:

identify multiple videos and multiple video segments for each of the multiple videos; and identify services to access the multiple videos.

Example 13

The method of example 1, 2, 3, 4, 5, 6, 7, 8, 9, 10, 11, or 12 wherein the operations further comprise:

configuring a separate player for each of the plurality of video segments.

Example 14

An apparatus comprising means to perform a method as in any preceding example.

Example 15

Machine-readable storage including machine-readable instructions, when executed, to implement a method or realize an apparatus as in any preceding example.

Example 16

A method for assembling a highlight video, comprising:

accessing a highlight video definition comprising a plurality of metadata comprising attributes that:

identify a video and an associated location to access the video;

identify a plurality of video segments within the video;

determining a segment play order for the plurality of video segments based on the segment metadata;

creating a dynamic video highlight without assembling the plurality of video segments into a single video through operations comprising:

beginning with a first segment and continuing with remaining segments in segment play order:

accessing the video at a location associated with a segment to be played;
presenting the video to a user until the segment to be played is complete;
selecting a next segment in the segment play order.

Example 16

The method of example 16 wherein the video is presented through an embedded video player.

Example 18

The method of example 16 further comprising:
accessing a set of metadata from a metadata collection agent, the set of metadata comprising attributes that:
identify each video of a plurality of videos and a service to access each video; and
identify at least one video segment in each video;
identify at least one event that occurs in each video segment;
causing presentation of a user interface comprising a plurality of selectable metadata attributes from the metadata set, selection of which either include or exclude the metadata attributes;
receiving selection of metadata attributes:
based on the selection, creating the highlight video definition.

Example 19

The method of example 18 further comprising storing the highlight video definition, storing specific segments and clips either identified by machine classification or by a user, or both for later distribution to other users.

Example 20

The method of example 18 further comprising sending the highlight video definition to another user.

Example 21

The method of example 16 wherein creating the dynamic video highlight further comprises:
instantiating a plurality of video players;
presenting a current video segment using a first of the plurality of video players; and
presenting a next video segment using a second of the plurality of video players.

Example 22

The method of example 21 wherein presentation of the current video segment and the next video segment occurs in an overlapping fashion.

Example 23

The method of example 21 wherein presentation of the current video segment and the next video segment occurs in a sequential fashion.

Example 24

The method of example 16 wherein the location is a remote video streaming service.

Example 25

The method of example 16 wherein the location is local.

Example 26

A system comprising a processor and computer executable instructions, that when executed by the processor, cause the system to perform operations comprising:
access a set of metadata from a metadata collection agent, the set of metadata comprising attributes that:
identify a video and a service to access the video; and
identify a plurality of video segments of the video:
identify at least one event that occurs in each of the plurality of video segments;
cause presentation of a user interface comprising an area to enter a query, or a plurality of selectable metadata attributes from the metadata set, selection of which either include or exclude the metadata attributes, or both:
responsive to receiving a query:
present the query to a trained machine learning model and receiving an intent and at least one entity:
identify a set of metadata attributes based on the intent and at least one entity;
responsive to receiving a selection of metadata attributes:
identify the set of metadata attributes based on the selection;
identify at least one video segment corresponding to the set of metadata attributes;
configure a player to access the at least one video segment at the corresponding service to play the at least one video segment.

Example 27

The system of example 26 wherein the set of metadata further comprises attributes that:
identify multiple videos and multiple video segments for each of the multiple videos:
identify services to access the multiple videos.

Example 28

The system of example 26 wherein the at least one video segment comprises multiple video segments and wherein the operations further comprise:
configuring a separate player for each of the multiple video segments.

Example 29

The system of example 26 further comprising creating a highlight video definition based on the selection of metadata attributes.

Example 30

The system of example 29 further comprising storing the highlight video definition for later retrieval and use, sending the highlight video definition to another user, or both.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for assembling and playing a highlight video on a display of a computing device, comprising:
   accessing a highlight video definition comprising a plurality of metadata comprising attributes that:
      identify a video and a uniform resource locator (URL) where the video can be accessed, wherein the URL corresponds to a video streaming service; and
      identify a plurality of video segments within the video, wherein the plurality of video segments includes a first segment and a second segment that are separated within the video by a gap segment, wherein the first segment includes a first event of interest, wherein the second segment includes a second event of interest, and further wherein the gap segment does not include an event of interest;
   determining a segment play order for the plurality of video segments based on the plurality of metadata, wherein the segment play order specifies that the second segment immediately follows the first segment;
   playing a dynamic video highlight without creating a copy of the plurality of video segments through operations comprising:
      instantiating a first video player and a second video player;
      based upon the segment play order, presenting the first segment to a user on the display via the first video player, wherein the second video player is hidden from display while the first segment is presented via the first video player;
      accessing the video at a second location associated with the second segment; and
      based upon the segment play order, immediately subsequent to the first video player concluding play of the first segment:
         hiding the first video player from display; and
         presenting the second segment to the user on the display via the second video player.

2. The method of claim 1, wherein the first video player is a first embedded video player, wherein the second video player is a second embedded video player.

3. The method of claim 1, further comprising:
   prior to accessing the highlight video definition, creating the highlight video definition based upon the plurality of metadata.

4. The method of claim 3, further comprising:
   storing the highlight video definition in computer-readable storage.

5. The method of claim 3, further comprising:
   causing the highlight video definition to be transmitted to a second computing device operated by a second user.

6. The method of claim 1, wherein the first segment and the second segment are identified by machine classification.

7. The method of claim 6, wherein the second video player buffers while the first video player plays the first segment.

8. The method of claim 6, wherein presentation of the current video segment and the next video segment occurs in a sequential fashion.

9. The method of claim 1, wherein the video streaming service streams videos of players playing video games.

10. The method of claim 1, wherein the video streaming service streams videos of sports.

11. A system comprising a processor and computer executable instructions, that when executed by the processor, cause the system to perform operations comprising:
   accessing a highlight video definition comprising a plurality of metadata comprising attributes that:
      identify a video and a uniform resource locator (URL) where the video can be accessed, wherein the URL corresponds to a video streaming service; and
      identify a plurality of video segments within the video, wherein the plurality of video segments includes a first segment and a second segment that are separated within the video by a gap segment, wherein the first segment includes a first event of interest, wherein the second segment includes a second event of interest, and further wherein the gap segment does not include an event of interest;
   determining a segment play order for the plurality of video segments based on the plurality of metadata, wherein the segment play order specifies that the second segment immediately follows the first segment;
   playing a dynamic video highlight without creating a copy of the plurality of video segments through operations comprising:
      instantiating a first video player and a second video player;
      based upon the segment play order, presenting the first segment to a user on the display via the first video player, wherein the second video player is hidden from display while the first segment is presented via the first video player;
      accessing the video at a second location associated with the second segment; and
      based upon the segment play order, immediately subsequent to the first video player concluding play of the first segment:
         hiding the first video player from display; and
         presenting the second segment to the user on the display via the second video player.

12. The system of claim 11, wherein first video player is a first embedded video player, wherein the second video player is a second embedded video player.

13. The system of claim 11, wherein the video streaming service streams videos of players playing video games.

14. The system of claim 11, further comprising creating the highlight video definition based on the plurality of metadata.

15. The system of claim 14, further comprising storing the highlight video definition for later retrieval and use, sending the highlight video definition to a computing device, or both.

16. The system of claim 14, wherein a user interface further provides for selecting the first segment and the second segment, and wherein the highlight video definition comprises information identifying the first segment and the second segment.

17. The system of claim 11, wherein the first segment and the second segment are identified by machine classification.

18. The system of claim 17, wherein the second video player buffers while the first video player plays the first segment.

19. The system of claim 17, wherein presentation of the first segment and the second segment occurs in a sequential fashion.

20. A computer storage medium comprising executable instructions that, when executed by a processor of a machine, cause the machine to perform operations comprising:

accessing a highlight video definition comprising a plurality of metadata comprising attributes that:
  identify a video and a uniform resource locator (URL) where the video can be accessed, wherein the URL corresponds to a video streaming service; and
  identify a plurality of video segments within the video, wherein the plurality of video segments includes a first segment and a second segment that are separated within the video by a gap segment, wherein the first segment includes a first event of interest, wherein the second segment includes a second event of interest, and further wherein the gap segment does not include an event of interest;
determining a segment play order for the plurality of video segments based on the plurality of metadata, wherein the segment play order specifies that the second segment immediately follows the first segment;
playing a dynamic video highlight without creating a copy of the plurality of video segments through operations comprising:
  instantiating a first video player and a second video player;
  based upon the segment play order, presenting the first segment to a user on the display via the first video player, wherein the second video player is hidden from display while the first segment is presented via the first video player;
  accessing the video at a second location associated with the second segment; and
  based upon the segment play order, immediately subsequent to the first video player concluding play of the first segment:
    hiding the first video player from display; and
    presenting the second segment to the user on the display via the second video player.

* * * * *